United States Patent
Saunders

(10) Patent No.: US 12,008,628 B2
(45) Date of Patent: Jun. 11, 2024

(54) SYSTEMS AND METHODS FOR OBSCURING CONTENT IN ELECTRONIC MESSAGES

(71) Applicant: SHOPIFY INC., Ottawa (CA)

(72) Inventor: Robert Saunders, Toronto (CA)

(73) Assignee: SHOPIFY INC., Ottawa (CA)

( * ) Notice: Subject to any disclaimer, the term of this patent is extended or adjusted under 35 U.S.C. 154(b) by 144 days.

(21) Appl. No.: 17/345,155

(22) Filed: Jun. 11, 2021

(65) Prior Publication Data

US 2022/0398646 A1    Dec. 15, 2022

(51) Int. Cl.
| | |
|---|---|
| *G06Q 30/06* | (2023.01) |
| *G06Q 10/083* | (2023.01) |
| *G06Q 10/0833* | (2023.01) |
| *G06Q 10/107* | (2023.01) |
| *G06Q 20/38* | (2012.01) |
| *G06Q 30/0601* | (2023.01) |
| *H04L 9/40* | (2022.01) |
| *G06Q 20/20* | (2012.01) |
| *G06Q 30/0282* | (2023.01) |

(52) U.S. Cl.
CPC ..... *G06Q 30/0633* (2013.01); *G06Q 10/0833* (2013.01); *G06Q 10/0838* (2013.01); *G06Q 10/107* (2013.01); *G06Q 20/383* (2013.01); *H04L 63/0421* (2013.01); *G06Q 20/202* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 8,046,268 | B2 * | 10/2011 | Hunt | G06Q 30/0641 705/26.1 |
| 8,407,805 | B2 * | 3/2013 | Warrington | G06F 21/6218 709/206 |
| 9,021,030 | B2 * | 4/2015 | Chakra | G06Q 10/107 715/752 |
| 9,665,887 | B2 * | 5/2017 | Raina | H04L 51/224 |
| 11,055,656 | B2 * | 7/2021 | Ruth | G06Q 50/30 |
| 11,107,029 | B1 * | 8/2021 | Henry | G06F 9/4881 |

(Continued)

OTHER PUBLICATIONS

Anon., "bluesign technologies ag: Retail Business Breakfast by Isobar engages local industry leaders," News Bites—Private Companies [Melbourne] Sep. 16, 2019. (Year: 2019).*

*Primary Examiner* — Nicholas D Rosen

(57) ABSTRACT

Some of the electronic messages transmitted post-purchase to the purchaser of a gift may include content that is of interest to the gift recipient. However, not all of the content in a message suitable for the purchaser might be suitable for a message to the gift recipient. In some embodiments, content may be obscured in a message for a given recipient. The obscuring may be implemented through at least one of: hiding, omitting, masking/obfuscating, or modifying the content presented. In some embodiments, a message is generated without having regard to the possible message recipients, and includes fields tagged to associate each field with a respective one or more recipients. For each recipient, a message is generated and transmitted in which the content that does not have a tag associated with that recipient is obscured.

23 Claims, 12 Drawing Sheets

(56) References Cited

U.S. PATENT DOCUMENTS

| | | | | |
|---|---|---|---|---|
| 2005/0108351 | A1* | 5/2005 | Naick | G06Q 10/107 709/207 |
| 2009/0024530 | A1* | 1/2009 | Porter | G06Q 30/0601 705/26.1 |
| 2009/0214034 | A1* | 8/2009 | Mehrotra | G06Q 10/107 380/255 |
| 2010/0010918 | A1* | 1/2010 | Hunt | G06Q 20/102 705/40 |
| 2010/0229246 | A1* | 9/2010 | Warrington | H04L 63/04 726/28 |
| 2013/0007140 | A1* | 1/2013 | Chakra | G06Q 10/107 709/206 |
| 2013/0021479 | A1* | 1/2013 | Mclaughlin | G06Q 30/06 348/207.1 |
| 2013/0290064 | A1* | 10/2013 | Altamirano | G06Q 30/06 705/7.26 |
| 2015/0039433 | A1* | 2/2015 | Raina | H04L 51/224 705/14.55 |
| 2017/0308517 | A1* | 10/2017 | Josifovski | G06Q 10/10 |
| 2020/0387863 | A1* | 12/2020 | Ruth | G06Q 10/087 |
| 2021/0056496 | A1* | 2/2021 | Gajeski | G16H 40/20 |
| 2022/0019687 | A1* | 1/2022 | Poutra | G06F 21/6245 |

\* cited by examiner

| E-Commerce Platform | Q Search | | JG John's Apparel Jonny B. Good |
|---|---|---|---|
| ⌂ Home | | All channels ⌄  Today ⌄ | |
| ⇄ Orders | Good afternoon, Jonny B.. | | |
| ◇ Products | Here's what's happening with | TOTAL SALES | Jun 1 |
| ○△ Customers | your store today. | $98.00 | 2 orders |
| ▦ Reports | Today's total sales  Today's visits | $125 | |
| ✸ Discounts | $98.00  1 | $75 ━━━━━━ | |
| ┿ Apps | | $25 | |
| SALES CHANNELS ⊕ | ● Update your Platform Payments tax details | 12am 8pm 4pm 11pm | |
| ⌂ Online Store ◈ | We require additional information to verify your identity. | TOTAL SALES BY CHANNEL | View dashboard |
| ▯ Mobile App | [ Update tax details ] | Online Store | Jun 1 |
| View all channels | ● Advanced Cash on Delivery has been deactivated for | $0.00 | 0 orders |
| | your store | Mobile app | |
| | [ See why ] | $0.00 | 0 orders |
| | | Shopify POS (126 York St.) | |
| ⚙ Settings | | $0.00 | 0 orders |

| Field 602 | Field Data 604 | Tags 606 |
|---|---|---|
| Confirmation text | "We have received your order" | Purchaser<br>Recipient - modify |
| Product | Women's Charm Bracelet | Purchaser<br>Recipient - modify |
| Estimated processing time | 2 days | Purchaser<br>Recipient |
| Shipping name | Betty Lee | Purchaser<br>Recipient |
| Shipping address | 123 Elm Road, New York, 10001 | Purchaser<br>Recipient |
| Shipping telephone no. | 212-111-2222 | Purchaser<br>Recipient |
| Shipping email address | betty_lee@examplemail.com | Purchaser<br>Recipient |
| Purchaser name | Al Smith | Purchaser |
| Billing address | 235 Oak Avenue New York, 10002 | Purchaser |
| Payment method | XXX-XXX-XXXX- 1234 12/21, 001 | Purchaser |
| Billing telephone no. | 212-000-0001 | Purchaser |
| Billing email address | al_smith@examplemail.com | Purchaser |
| Order no. | 4450592 | Purchaser<br>Recipient |

FIG. 6

The Jewelry Store

ORDER CHECKOUT

700

BILLING INFORMATION:

Al Smith
235 Oak Avenue
New York, NY, USA, 10002
Credit Card XXX-XXX-XXX-1234
12/21, 001
al_smith@examplemail.com

SHIPPING INFORMATION:

Betty Lee
123 Elm Road
New York, NY, USA, 10001
betty_lee@examplemail.com
212-111-2222

This purchase has been marked as gift

800

In emails to the recipient, please omit the following information:
- ✓ Purchaser name ☐ Product information
- ✓ Product price ☐ Estimated processing time In emails to the recipient, please modify the following information:
- ☐ Purchaser name ✓ Product information
- ☐ Product price ☐ Estimated processing time

[CHECK OUT]

SYSTEMS AND METHODS FOR OBSCURING CONTENT IN ELECTRONIC MESSAGES

FIELD

The present application relates to generation of electronic communications, and, more particularly, to obscuring content in electronic messages relating to an online purchase.

BACKGROUND

When a customer purchases a product on an online store or online marketplace, the platform hosting the online store or online marketplace typically transmits one or more electronic communications/messages to the customer post-purchase. Examples of electronic messages may include messages such as: a confirmation message confirming the order was received and summarizing the order details; a message indicating that the product has shipped; a message providing a shipping update; a message providing product care instructions; a message prompting the customer to review the product; etc.

The electronic messages are transmitted over a network to the customer's electronic device using the electronic contact information supplied by the customer, such as the customer's email address and/or IP address. In one example, the customer provides an e-mail address during the online checkout process, and the electronic messages are sent to that email address. In another example, the customer uses a native or web software application ("app") to interact with the platform using their device, and the electronic messages are transmitted and displayed through the app.

In some instances, the customer may be purchasing a product as a gift for someone else. The customer purchasing the gift will be referred to as the purchaser, and the gift recipient will be referred to as the recipient. The purchaser may have the gift shipped directly to the recipient. In this scenario, some of the electronic messages typically transmitted to the purchaser post-purchase may include content that is of interest to the recipient. However, such messages are only sent to the purchaser's device.

SUMMARY

To allow for post-purchase electronic messages to be sent to a gift recipient, during the online checkout process the purchaser may indicate the product is a gift and provide the electronic contact information of the recipient, e.g. the purchaser may provide the recipient's email address.

However, a post-purchase message that is suitable for transmission to a purchaser might have content unsuitable for transmission to a gift recipient. As one example, the post-purchase message may include means to edit an order. As another example, the message may carry information personal to the purchaser, such as the purchaser's payment details or billing address, which for security and privacy reasons needs to be obscured from a gift recipient.

The platform is therefore faced with the technical problem of having to automatically decide which message recipient(s) is/are to receive the message and which content is to be obscured for which message recipients, as well as implementing a computer-based method for automatically obscuring that content. Automatic decision making regarding obscuring message content prevents a merchant from revealing sensitive or personal information to unsuitable message recipients, protecting the privacy of a purchaser. As well, automatic generation of message content allows for simpler customization of messages to improve the experience of all of the message recipients. As customization of messages is time consuming, automatic generation of messages reduces the work-load of the merchant and eliminates potential for human error.

Embodiments are disclosed in which a post-purchase message is transmitted to a gift recipient having obscured content. The obscuring may be a form of hiding information from the recipient, which may be implemented through omission of the content from the message, or by masking or obfuscation, or by replacing specific information with modified content, e.g. generic information. In one example implementation, a post-purchase message generated by a platform includes one or more fields that are tagged to associate each of the fields with a respective one or more message recipients. The message is generated without having regard to the possible message recipients. The platform then determines the recipients for the message and, for each recipient, obscures the content that does not have a tag associated with that recipient to generate a modified message, and then transmits that modified message to the recipient. In this way, a single "master" or "template" message may first be generated and then used to generate one or more modified messages, each for a respective recipient, with each modified message having content suitable for that respective recipient.

In an embodiment, there is provided a computer-implemented method. The method includes a step of obtaining first electronic contact information associated with a purchaser of a product and second electronic contact information associated with a recipient of the product. The method may also include steps of generating a first electronic message and generating a second electronic message. The second electronic message may include at least some content present in the first electronic message and may obscure other content present in the first electronic message. The method may also include transmitting the first electronic message to a device associated with the first electronic contact information and transmitting the second electronic message to another device associated with the second electronic contact information.

In some embodiments, the method step of obtaining the first electronic contact information and the second electronic contact information may occur during an online checkout process. The obtaining step may further include transmitting web content to allow for entering of an email address of the purchaser, and to allow for selection of an indication that the product is a gift. The obtaining step may also include receiving, responsive to the web content, the indication that the product is a gift and indications of at least: the email address of the purchaser and an email address of the recipient. The obtaining may include a step of storing, in memory, the email address of the purchaser as the first electronic contact information and the email address of the recipient as the second electronic contact information.

In some embodiments, the obtaining step of the computer-implemented method may further include, in response to the receiving the indication that the product is a gift, transmitting further web content to allow selection of one or more rules from amongst a plurality of rules. The plurality of rules may be for obscuring particular content present in the first electronic message from the second electronic message. Responsive to the further web content, the obtaining step may include receiving an indication of the selection of the one or more rules from amongst the plurality of rules. The generation of the second electronic message may include obscuring the particular content present in the first electronic message from the second electronic message based on the selection.

In some embodiments, obscuring the other content present in the first electronic message may include at least one of: omitting particular content present in the first electronic message, masking the particular content, or generating modified content to replace the particular content.

In some embodiments, the first electronic message may include information private to the purchaser. In some embodiments, the second electronic message may obscure the information private to the purchaser.

In some embodiments, the information private to the purchaser may include at least one of: sensitive information, personally identifiable information, or payment-related information.

In some embodiments, the computer-implemented method may also include a step of generating a master message including multiple fields. Each field of the multiple fields may be assigned at least one of: a first tag that corresponds to the purchaser, a second tag that corresponds to the recipient, or a third tag indicating that a content modification rule of one or more content modification rules applies. The first electronic message may include the content of the multiple fields assigned the first tag. The second electronic message may include the content of any of the multiple fields that are assigned the second tag and modified content for any of the multiple fields that are assigned the third tag.

In some embodiments, the computer-implemented method may include transmitting web content to at least one of: a merchant device associated with a merchant of the product, or a user device associated with the purchaser. The method may also include a step of receiving, responsive to the web content, an indication of one or more rules for obscuring particular content present in the first electronic message from the second electronic message. The method may also include a step of assigning at least one tag to one or more fields of the master message based on the one or more rules.

In some embodiments, obscuring the other content present in the first electronic message may include at least one of: omitting, in the second electronic message, the content of at least one field of the generated master message that is assigned the first tag and not assigned the second tag; masking, in the second electronic message, the content of at least one field of the generated master message that is assigned the first tag and not assigned the second tag; or replacing, in the second electronic message, the content of at least one field of the first electronic message with the modified content for at least one field of the generated master message that is assigned the third tag.

In some embodiments, the first electronic message may have a plurality of fields, and each field may carry respective content. The content of a field of the plurality of fields may include at least one of: billing information of the purchaser; contact information of the purchaser; mailing address of the recipient; a name of the product; shipping information for the product; an indication confirming purchase of the product; or care instructions for the product.

In some embodiments, the first electronic message may be a first email directed to the device associated with the first electronic contact information and the second electronic message is a second email directed to the another device associated with the second electronic contact information. Both the first email and the second email may provide at least one of: a confirmation message confirming the order was received and summarizing order details; a message indicating that the product has shipped; a message providing a shipping update; or, a message requesting submission of a review of the product.

In some embodiments, the step of generating the first electronic message occurs in response to an event post-purchase.

A system is also disclosed that is configured to perform the methods disclosed herein. For example, the system may include a memory to store first electronic contact information and second electronic contact information and at least one processor to directly perform (or instruct the system to perform) the method steps.

In another embodiment, there is provided a computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIG. 2 illustrates a home page of an administrator, according to one embodiment;

FIG. 6 illustrates an example of order details stored in memory, according to one embodiment;

FIGS. 7 and 8 illustrate example user interfaces providing a purchaser with a checkout page for an online purchase of a gift, according to some embodiments;

FIG. 9 illustrates an example user interface on which a merchant may set obscuring rules, according to one embodiment;

DETAILED DESCRIPTION

For illustrative purposes, specific example embodiments will now be explained in greater detail below in conjunction with the figures.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
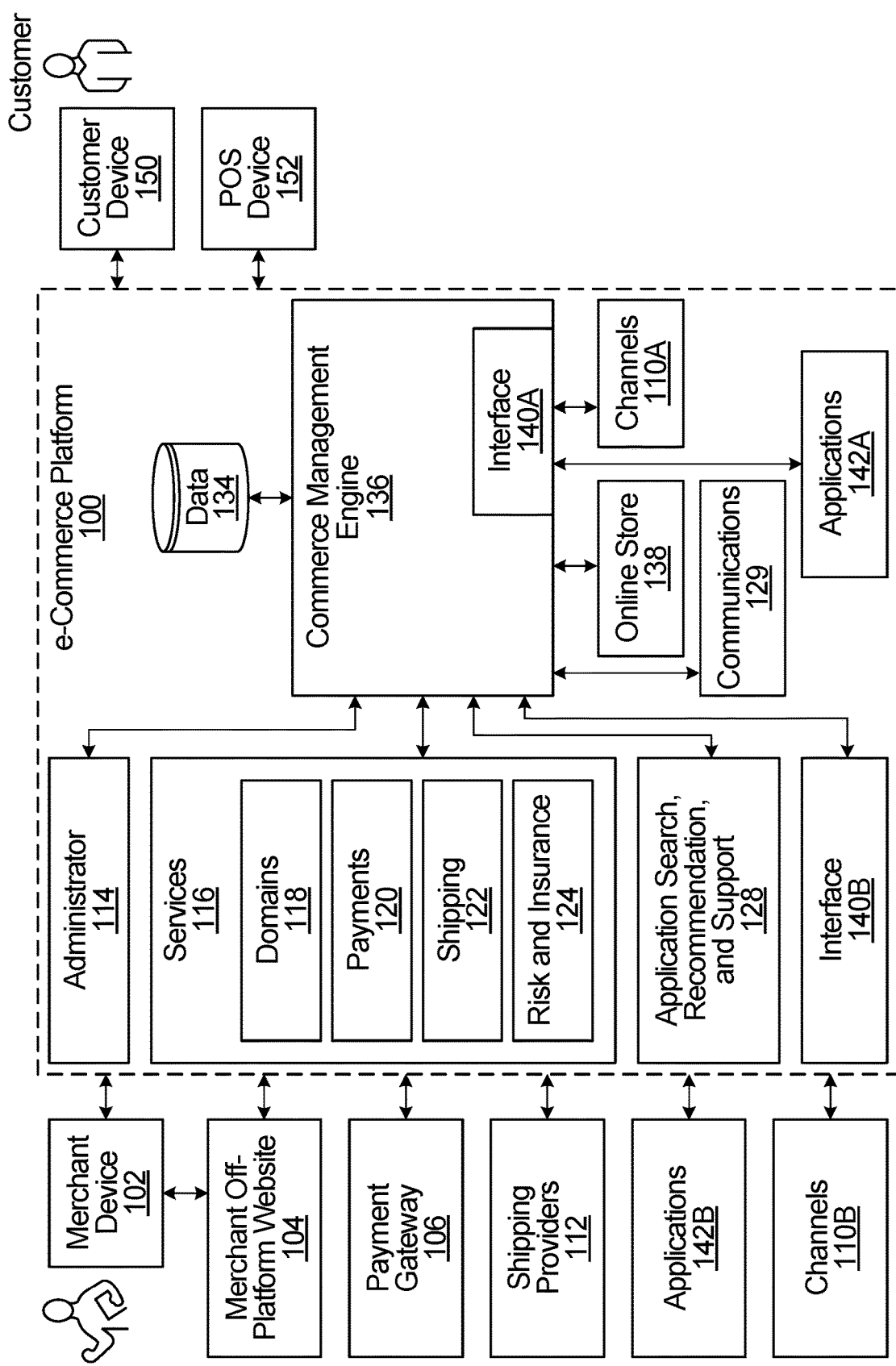
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue.

Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Generating Order Messages in the E-Commerce Platform 100

A user may interact with an online platform, such as with online store 138 or an online marketplace on e-commerce platform 100, to electronically purchase a product or a service as a gift for a gift recipient. The user may be referred to as the purchaser, and the gift recipient may be referred to as the recipient. In one example, the platform is e-commerce platform 100 implementing an online store 138 associated with a merchant having a merchant account on the e-commerce platform 100. After purchasing the gift for the recipient, notifications, which may also be referred to as electronic messages herein, may be transmitted to the purchaser and the recipient regarding post-purchase events, such as the confirmation of the order and shipping of the gift. However, some of the information in the electronic messages might not be suitable or relevant to both the purchaser and recipient. The purchaser might not want particular information to be presented to the recipient, such as the purchaser's billing information and/or gift details.

Figure 3:
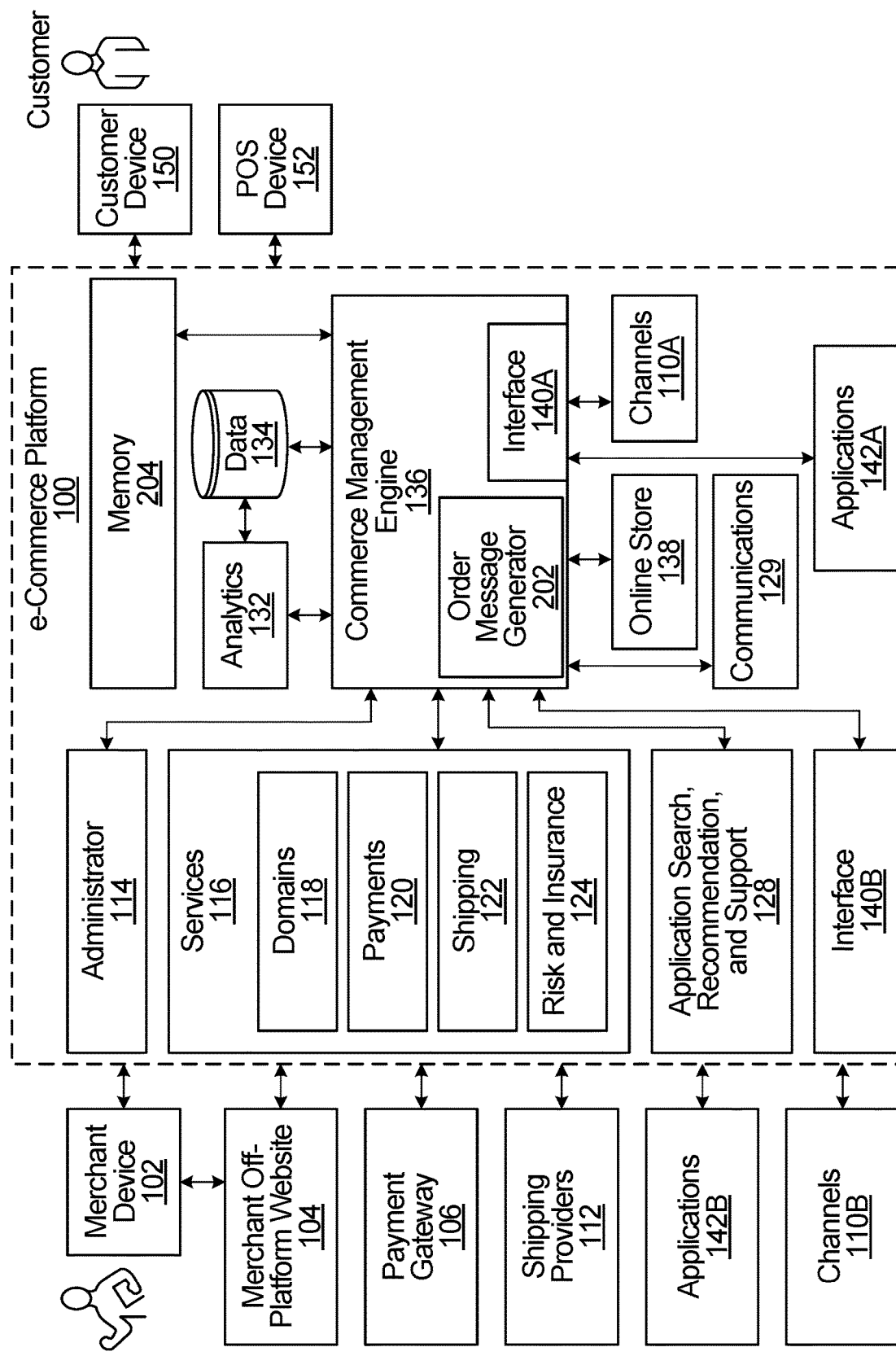
FIG. 3 illustrates the e-commerce platform of FIG. 1, but with a memory and a order message generator, according to one embodiment.

FIG. 3 illustrates the e-commerce platform 100 of FIG. 1, but with the additions of an order message generator 202 and a memory 204. The order message generator 202 may be embodied as part of the commerce management engine 136. As the messages generated by the order message generator 202 may be notifications provided to either the purchaser or the recipient, the order message generator 202 may also be referred to as an order notification generator. The order message generator 202 performs the message generating methods disclosed herein. For example, the order message generator 202 may generate order messages relating to a gift purchased online in the manner described herein. The order message generator 202 may also provide output of separate messages generated for each of the purchaser of the gift and one or more recipients in the manner described herein. The order message generator 202 may be implemented by one or more general-purpose processors that execute instructions stored in a memory (e.g. in memory 204) or stored in another non-transitory computer-readable medium. The instructions, when executed, cause the order message generator 202 to perform the operations of the order message generator 202, e.g., operations relating to obtaining the first and the second contact information for a gift purchased in an online store 138 or an online marketplace, storing the contact information in memory, and the subsequent generation and transmission of messages to user devices associated with each of the first and the second contact information. Alternatively, some or all of the order message generator 202 may be implemented using dedicated circuitry, such as an application specific integrated circuit (ASIC), a graphics processing unit (GPU), or a programmed field programmable gate array (FPGA). In some embodiments, the order message generator 202 may be located inside the e-commerce platform 100 but external to, and coupled to, the commerce management engine 136. In some embodiments, the order message generator 202 may instead be located externally to the e-commerce platform 100 and possibly coupled to the commerce management engine 136.

The memory 204 of the e-commerce platform 100 of FIG. 3 may contain data in the form of order details, which may include information provided to the order message generator 202 at the time of purchase of the gift, in the manner described herein. In some embodiments, the memory 204 may be part of the order message generator 202. In some embodiments, the memory 204 may be external to the e-commerce platform 100, and coupled to either the e-commerce platform 100 or the commerce management engine 136.

Although the order message generator 202 in FIG. 3 is illustrated as a distinct component of the e-commerce platform 100 in commerce management engine 136, this is only an example. The order message generator 202 could also or instead be provided by another component residing within or external to the e-commerce platform 100. In some embodiments, either or both of the applications 142A-B may provide the order message generator 202 that implements the functionality described herein. The location of the order message generator 202 is implementation specific. In some implementations, the order message generator 202 is provided at least in part by an e-commerce platform, either as a core function of the e-commerce platform or as an application or service supported by or communicating with the e-commerce platform.

In some embodiments, at least a portion of order message generator 202 could be implemented in a merchant device (e.g. merchant device 102), a recipient device, and/or a purchaser device (e.g. customer device 150). For example, the merchant device 102 and/or customer device 150 could store and run at least some of the order message generator 202 locally as a software application.

Although the embodiments described herein may be implemented using the order message generator 202 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, but might instead be implemented as a standalone component or service. Therefore, the embodiments below will be described more generally.

Example System for Generating Order Messages

Figure 4:
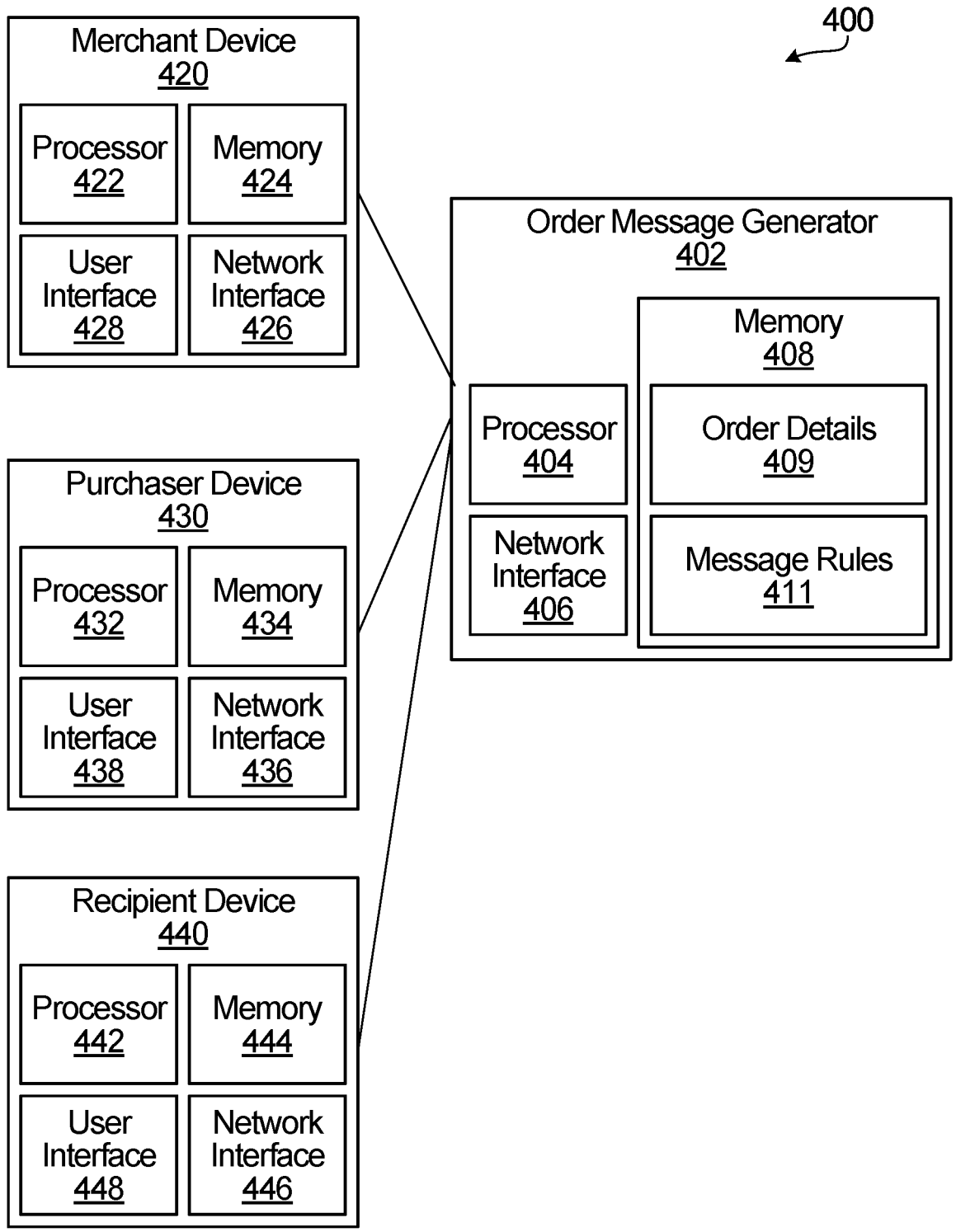
FIG. 4 illustrates a system for generating order messages for online purchases, according to one embodiment.

FIG. 4 illustrates a system 400 for generating order messages for online purchases, according to one embodiment. The system 400 includes an order message generator 402, a merchant device 420, at least one purchaser device 430, and at least one recipient device 440. Only a single purchaser device 430 and a single recipient device 440 are illustrated.

The order message generator 402 may be a part of an e-commerce platform, e.g. e-commerce platform 100. The order message generator 402 of system 400 includes a processor 404, and a network interface 406. The processor 404 directly performs, or instructs the order message generator 402 to perform, the operations described herein of the order message generator 402, e.g., operations such as storing order details 409 including electronic contact information provided by the purchaser device 430, generating order messages for the purchaser and the recipient, and transmitting the respective order messages to the purchaser device 430 and the recipient device 440, etc. The processor 404 may be implemented by one or more general purpose processors that execute instructions stored in a memory (e.g. in memory 408) or stored in another computer-readable medium. The instructions, when executed, cause the processor 404 to directly perform, or instruct the order message generator 402 to perform the operations described herein. In other embodiments, the processor 404 may be implemented using dedicated circuitry, such as a programmed FPGA, a GPU, or an ASIC.

The network interface 406 is for communicating over a network, e.g. to communicate with the merchant device 420, the purchaser device 430 and/or the recipient device 440. The network interface 406 may be implemented as a network interface card (NIC), and/or a computer port (e.g. a physical outlet to which a plug or cable connects), and/or a network socket, etc., depending upon the implementation.

The order message generator 402 further includes a memory 408. A single memory 408 is illustrated in FIG. 4, but in implementation the memory 408 may be distributed. The memory 408 may include order details 409 and message rules 411, which will be described in more detail later.

In some embodiments, the order message generator 402 may be implemented inside of an e-commerce platform, e.g. inside e-commerce platform 100. In some embodiments, the processor 404, memory 408, and/or network interface 406 may be located outside of the order message generator 402.

A plurality of merchants may communicate with (e.g. access) the order message generator 402 over a network using merchant devices. For example, a merchant may use the merchant device 420 to input obscuring rules relating to the content of a message sent to the purchaser and/or recipient of a gift ordered online. The merchant device 420 may be a mobile device (e.g. a smartphone, laptop, tablet), a desktop computer, etc., depending upon the implementation. The merchant device 420 includes a processor 422, a memory 424, a user interface 428, and a network interface 426. The processor 422 directly performs, or instructs the merchant device 420 to perform, the operations of the merchant device 420 described herein, e.g. enabling the merchant to enter, via the use of user interface 428, obscuring rules for content of an order message associated with the online purchase of a gift. The processor 422 may be implemented by one or more general purpose processors that execute instructions stored in a memory (e.g. memory 424) or stored in another computer-readable medium. The instructions, when executed, cause the processor 422 to directly perform, or instruct the merchant device 420 to perform, the operations described herein. In other embodiments, the processor 422 may be implemented using dedicated circuitry, such as a programmed FPGA, a GPU, or an ASIC.

The user interface 428 may be implemented as a display screen (which may be a touch screen), and/or a keyboard, and/or a mouse, etc., depending upon the implementation. The network interface 426 is for communicating with the order message generator 402 over the network. The structure of the network interface 426 will depend on how the merchant device 420 interfaces with the network. For example, if the merchant device 420 is a mobile phone, laptop, or tablet, the network interface 426 may comprise a transmitter/receiver with an antenna to send and receive wireless transmissions to/from the network. If the merchant device 420 is a personal computer connected to the network with a network cable, the network interface 426 may comprise a NIC, and/or a computer port (e.g. a physical outlet to which a plug or cable connects), and/or a network socket, etc.

A plurality of purchasers may communicate with (e.g. access) the order message generator 402 over a network using purchaser devices. For example, a purchaser may use purchaser device 430 to input information relating to gifts being ordered online, e.g. shipping information of the recipient and billing information of the purchaser. The purchaser device 430 may be a mobile device (e.g. a smartphone, laptop, tablet), a desktop computer, an augmented reality (AR) device, etc., depending upon the implementation. The purchaser device 430 includes a processor 432, a memory 434, a user interface 438, and a network interface 436. The processor 432 directly performs, or instructs the purchaser device 430 to perform, the operations of the purchaser device 430 described herein, e.g. enabling the purchaser to enter, via the use of user interface 438, information that is stored as part of the order details 409 and message rules 411, associated with the online purchase of a gift. The processor 432 may be implemented by one or more general purpose processors that execute instructions stored in a memory (e.g. memory 434) or stored in another computer-readable medium. The instructions, when executed, cause the processor 432 to directly perform, or instruct the purchaser device 430 to perform, the operations described herein. In other embodiments, the processor 432 may be implemented using dedicated circuitry, such as a programmed FPGA, a GPU, or an ASIC.

The user interface 438 may be implemented as a display screen (which may be a touch screen), and/or a keyboard, and/or a mouse, etc., depending upon the implementation. The network interface 436 is for communicating with the order message generator 402 over the network. The structure of the network interface 436 will depend on how the purchaser device 430 interfaces with the network. For example, if the purchaser device 430 is a mobile phone, laptop, or tablet, the network interface 436 may comprise a transmitter/receiver with an antenna to send and receive wireless transmissions to/from the network. If the purchaser device 430 is a personal computer connected to the network with a network cable, the network interface 436 may comprise a NIC, and/or a computer port (e.g. a physical outlet to which a plug or cable connects), and/or a network socket, etc.

One or more recipients may access the order message generator 402 over a network using recipient devices, e.g. to be provided with an order message generated by the order message generator 402. For ease of explanation, only a single recipient device 440 is illustrated in FIG. 4. The recipient device 440 may be a mobile device (e.g. a smartphone, laptop, tablet), a desktop computer, an AR device, etc., depending upon the implementation. The recipient device 440 includes a processor 442, a memory 444, a user interface 448, and a network interface 446. The processor 442 directly performs, or instructs the recipient device 440 to perform, the operations of the recipient device 440 described herein, e.g. receiving and displaying, through the user interface 448, an order message generated by the order message generator 402. The processor 442 may be implemented by one or more general purpose processors that execute instructions stored in a memory (e.g. memory 444) or stored in another non-transitory computer-readable medium. The instructions, when executed, cause the processor 432 to directly perform, or instruct the recipient device 440 to perform, the operations described herein. In other embodiments, the processor 442 may be implemented using dedicated circuitry, such as a programmed FPGA, a GPU, or an ASIC.

The user interface 448 may be implemented as a display screen (which may be a touch screen), and/or a keyboard, and/or a mouse, etc., depending upon the implementation. The network interface 446 is for communicating with the order message generator 402 over the network. The structure of the network interface 446 will depend on how the recipient device 440 interfaces with the network. For example, if the recipient device 440 is a mobile phone, laptop, or tablet, the network interface 446 may comprise a transmitter/receiver with an antenna to send and receive wireless transmissions to/from the network. If the recipient device 440 is a personal computer connected to the network with a network cable, the network interface 446 may comprise a NIC, and/or a computer port (e.g. a physical outlet to which a plug or cable connects), and/or a network socket, etc.

In some embodiments, the order message generator 402 is part of an e-commerce platform, e.g. e-commerce platform 100. For example, the order message generator 402 may be order message generator 202 illustrated in FIG. 3. However, this is not necessary. The order message generator 402 may, for example, instead be provided by another component of an e-commerce platform or implemented as a stand-alone component or service that is external to an e-commerce platform. In some embodiments, either or both of the applications 142A-B of FIG. 3 provide the order message generator 402 in the form of a downloadable application that is available for installation, e.g. in relation to a customer and/or merchant account. In other embodiments, the order message generator 402 may be implemented on or in association with a computer system that is not an e-commerce platform. In some embodiments, some operations of the order message generator 402 described herein could potentially be implemented in part on/by merchant device 420 and/or purchaser device 430 and/or recipient device 440.

Operation of the order message generator 402 will now be described in the context of example embodiments.

In an example, a computer platform, such as e-commerce platform 100, implementing an online store 138 or online marketplace, includes the order message generator 402, which is to generate one or more post-purchase electronic messages for transmission to one or more recipients. As mentioned above, examples of electronic messages may include messages such as: a confirmation message confirming the order was received and summarizing the order details; a message indicating that the product has shipped; a message providing a shipping update; a message providing product care instructions; a message prompting the customer to review the product; etc.

In some embodiments, multiple templates may be stored in the memory 408 of an order message generator 402 in relation to a single message, each template having content for a respective possible recipient. For example, there may be two order confirmation message templates for a product: (1) a first template suitable for transmission to a purchaser, including content private to the purchaser, such as the purchaser's billing address; and (2) a second template suitable for transmission to a gift recipient, which omits the purchaser's private information and possibly also replaces the product name with something more generic. For example, the confirmation message transmitted to the purchaser via the purchaser device 430 may include the sentence "We have received your order", it may include the product name "Women's Charm Bracelet", and it may include the billing details of the purchaser. Whereas, the confirmation message sent to the recipient via the recipient device 440 may instead include the sentence "A gift will soon be coming your way", may replace the product name with a generic title "Jewelry" or generic text, such as, "a surprise product", and may omit the billing details of the purchaser.

In some embodiments, a first template and a second template for a particular message or message type might not be derived from a same starting template. For instance, the first template and second template may include different content and/or may be formatted differently. As an example, two templates may be stored for an electronic message indicating delivery of a gift. The first template, which may be used to generate an electronic message for the purchaser, may be a simple text-based message indicating the date and time of delivery. The second template, which may be used to generate an electronic message for the gift recipient, may include images, product use instruction, etc. The first and second templates used to generate electronic messages following a particular post-purchase event might have the same intent, ex. to inform the purchaser and recipient that the gift has been delivered, but may convey the information differently.

In some embodiments, a merchant may configure, through their merchant device 420, obscuring rules, such as content modification rules for the message to be sent to the gift recipient. For example, the merchant may configure the version of the confirmation message sent to the gift recipient to specifically begin with the sentence "A gift will soon be coming your way". The obscuring rules may be stored in memory 408 as part of the message rules 411.

A further specific embodiment, and some variations thereof, will be described below. In the embodiment below, the order message generator 402 implements a technical solution that may allow for more efficient message generation in the majority of cases (where the purchased product is not a gift), thereby saving computer resources, while still accommodating the gift giving scenario.

In some embodiments, the order message generator 402 implements a "master message generator" and a "secondary message generator". When an event occurs post-purchase that triggers an electronic message to be sent, the master message generator generates the content of the electronic message without regard to the recipient, and by default includes all detail unobscured that would be included for the typical scenario of a customer purchasing an item for themselves. In this way the message can be generated the same way for all purchases without regard to who might be the recipient or what restrictions there might be on the message content, thereby simplifying the platform's ability to generate the message content, while still providing message content that is suitable for the vast majority of cases (i.e. when the product is not a gift). The message generation described herein is therefore efficient for an order message generator 402 and/or an e-commerce platform 100.

However, in the relatively uncommon fact pattern of when the product is being purchased for a gift recipient and shipped directly to that gift recipient, the message content efficiently generated by the master message generator might have content that needs to be obscured for the gift recipient. The order message generator 402 is then faced with the technical problem of having to automatically decide which message recipient(s) is/are to receive the message and which content is to be obscured for which message recipients, as well as implementing a computer-based method for automatically obscuring that content, possibly in a custom way selected by the merchant and/or purchaser.

To try to address the technical problem above, in one embodiment the message generated by the master message generator includes one or more fields that are tagged to associate each of the fields with a respective one or more message recipients. A field can be a section of content that includes multiple items of information, e.g. billing details, or can be a single item of information, e.g. product name. The message is generated by the master message generator without having regard to the possible message recipients. The secondary message generator then determines the recipients for the message and, for each recipient, obscures the content that does not have a tag associated with that recipient to generate a modified message, and then transmits that modified message to the recipient.

Figure 5:
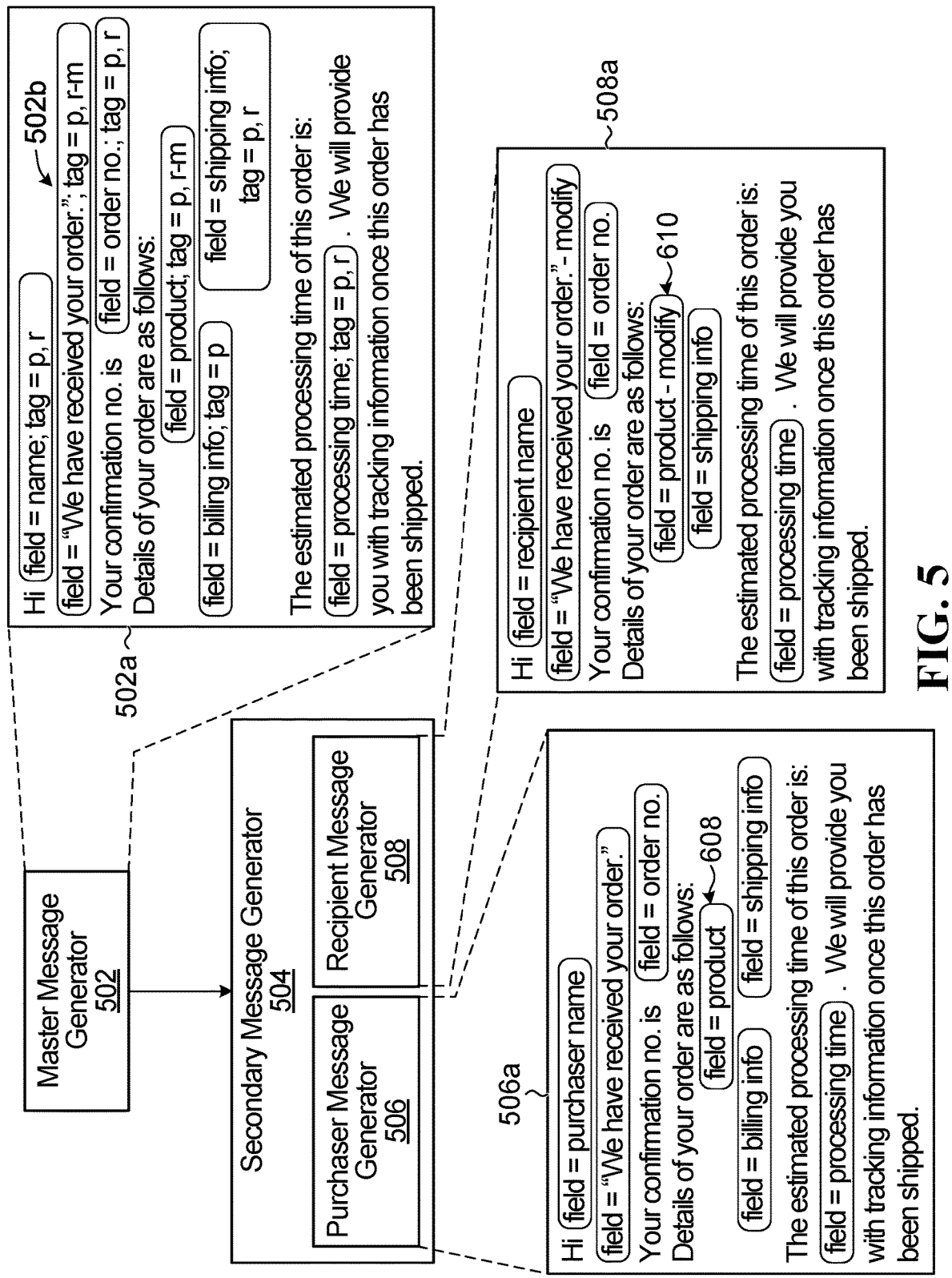
FIG. 5 illustrates an example of order message generation provided by the order message generator, according to one embodiment.

FIG. 5 illustrates an example of order message generation provided by the order message generator 402, according to one embodiment. The order message generation is performed by the processor 404, e.g. the processor 404 implements master message generator 502 and secondary message generator 504. The master message generator 502 is used to generate the content of a master message without regard to the recipient. Following the generation of the master message, the secondary message generator 504 may then generate order messages that are specific to each message recipient that may receive a message in response to the post-purchase event. In FIG. 5, the secondary message generator 504 includes a purchaser message generator 506 and a recipient message generator 508. The purchaser message generator 506 generates a message to be sent to the purchaser device 430 for viewing by the purchaser. The recipient message generator 508 generates a message to be sent to the recipient device 440 to be viewed by the recipient.

In FIG. 5, the message that is being generated is an order confirmation message indicating that the online store 138 or online marketplace has received the gift order. Message templates 502a, 506a, and 508a are example message templates of the order confirmation message as generated by the master message generator 502, the purchaser message generator 506, and the recipient message generator 508, respectively.

The master message template 502a includes a skeleton outline of an order confirmation message, as well as indications of which fields may be included as part of the message. A field may store text directly (e.g. "We have received your order"), or may store a variable that is populated upon generation of the message based on information retrieved from a database, such as from the order details. For example, the variable "order number" may be populated with the actual order number from the order details of the applicable order. In some embodiments, a field may be referred to as a "section" and/or include a block of content.

The field indicated at 502b includes the text: "We have received your order." The field indicated at 502b also includes tags "p" and "r-m", where "p" may be a tag associated with the purchaser of the gift and "r" may be a tag associated with the recipient of the gift. The "-m" appended to the recipient tag indicates that the content in this field may be modified in the recipient message. In this example, the confirmation message sent to the purchaser therefore includes the text "We have received your order", whereas the confirmation message sent to the recipient may be modified to say something different, e.g. "A gift will soon be coming your way!". This is because the tag "p" indicates that the text "We have received your order" is included in the purchaser's confirmation message, and the tag "r-m" indicates that this same text may be modified in the recipient's confirmation message.

In some embodiments, the master message template 502a includes all of the template text and fields that may appear in one or both of the template messages provided by the secondary message generator 504. In such embodiments, there are no other fields in the purchaser message template 506a and the recipient message template 508a that do not appear in the master message template 502a.

The purchaser message template 506a of FIG. 5 includes all of the fields of the master message template 502a. In this example, the processor 404 of the order message generator 402 executes instructions to generate a purchaser message that is identical to the master message. In the purchaser message template 506a, the included fields do not show the assigned tags.

Conversely, the recipient message template 508a of FIG. 5 includes only some of the fields of the master message template 502a. For instance, the field "billing info" is not included in the recipient message template 508a, as this field has not been assigned the tag associated with the recipient in the master message template 502a.

The recipient message template 508a may also indicate whether the content in a field may be modified in the recipient message. For instance, the field "We have received your order" in the recipient message template 508a is appended with "-modify". This may provide instruction to the processor 404 to modify the content of the field based on the message rules 411 when instructing the generation of the recipient message via the recipient message generator 508.

In an example, a purchaser purchases a product on an online store from a merchant. Upon completion of the online checkout, the following event occurs in the order message generator 402: "Order received having order details XYZ", where the order details "XYZ" are stored in memory 408 and accessible to the order message generator 402 using an ID lookup. The order details may be stored as order details 409 in memory 408, and may include information such as Store ID, Product ID, Product Quantity, Billing Details, Shipping Address, etc.

In response to occurrence of the event, the master message generator 502 generates a master message to confirm the order. Each field in the master message is assigned the tag "purchaser" ("p" in template 502a in FIG. 5) to indicate that it is content suitable to be sent to the purchaser device 430 of the one who purchased the product. Certain fields are tagged "recipient" ("r" in template 502a in FIG. 5) to indicate that these are fields having content suitable to be viewed by a gift recipient, if there is a gift recipient, and are presented to the recipient via the recipient device 440. Certain other fields may be tagged "recipient-modify" ("r-m" in template 502a in FIG. 5) indicating that these are fields having content suitable to be viewed by a gift recipient, subject to a content modification rule (e.g. to replace a detail with something more generic).

The tagging structure of FIG. 5, in which "p" and "r" are tags assigned to fields relating to the purchaser and recipient, respectively, and "-m" is used to indicate a modification of content in a field, is merely an example. The tagging structure used to assign tags to fields may be implemented in a variety of manners, and is not limited to this example.

The tags may be implemented as IDs stored in memory 408, each in association with a respective field. When there is a "Purchaser" tag, the field is included in the message sent to the purchaser. When there is a "Recipient" tag, the field is included in the version of the message sent to a gift recipient (if there is a gift recipient). When there is a "Recipient-modify" tag, the field is included in the version of the message sent to a gift recipient, but in a modified manner according to an obscuring rule. The obscuring rule may be stored in the message rules 411 in memory 408 and be specific to a product, merchant, store, and/or purchaser.

The master message is then processed by the secondary message generator 504, which uses the order details 409 and any message rules 411 to generate one or more specific messages for transmission to at least one of the purchaser and the recipient.

In an example, a purchaser, Al Smith, may purchase a product, a women's charm bracelet from an online store called "The Jewelry Store". The purchase may be a gift for his friend, Betty Lee, and he may ship the product to her directly.

FIG. 6 illustrates an example of order details 409 stored in memory 408, according to one embodiment. In this example, the order details 409 are provided by Al Smith while purchasing the women's charm bracelet from The Jewelry Store's online store. The order details 409 may be stored as a table, as shown in FIG. 6. The table may include a first column 602 that includes the name of the field. The table of the order details 409 may include a second column 604 that includes the field data, which may be the content used to populate the field in an order message. A third column 606 of the order details 409 may include the tags assigned to the field.

The tags in the third column 606 may include a "purchaser" tag and/or a "recipient" tag. A "purchaser" tag indicates that the field is to be provided in a message generated by the order message generator 402 to the purchaser, and a "recipient" tag indicates that the field is to be provided in a message generated by the order message generator 402 to the recipient. The "purchaser" and/or "recipient" tags may be appended with "-modify" to indicate that the content in the second column 604 may be modified when presented to the purchaser and/or recipient. With the use of the "-modify" modifier to the tag, the content in the second column 604 may be modified in accordance with an obscuring rule, as described herein.

In an example, the second row of the order details 409 of FIG. 6 stores the field: "Product". The associated field data is the name of the gift item purchased by Al Smith, e.g., "Women's Charm Bracelet". This field is assigned the tags: "Purchaser" and "Recipient-modify". The "Purchaser" tag indicates that the field data as stored in the second column 604 is to be shown to Al Smith in a purchaser message, such as an order message generated by the purchaser message generator 506 shown in FIG. 5. As can be seen in the purchaser message template 506a of FIG. 5, the product field 608 is included in the template 506a.

The "Recipient-modify" tag indicates that the product name as shown in the second column 604 might not be presented as is in the recipient message sent to Betty Lee. The field is not removed in the recipient message, but the content of the field may be modified based on an obscuring rule. This is shown, for instance, by the recipient message template 508a generated by the recipient message generator 508 in FIG. 5. A modified version of the product field may be included as part of the recipient message template 508a, as shown at 610 of FIG. 5. The content of the field, "Women's Charm Bracelet", may be substituted out for a generic name or statement, such as "It's a surprise!", according to a content modification rule.

In another example, the fourth row of the order details 409 stores the field: "Shipping name", the field data: "Betty Lee", and the tags: "Purchaser" and "Recipient". As tags associated with both the purchaser and recipient are assigned to this field, the content stored in the second column 604 will be included in the "Shipping name" field in both the purchaser order message and recipient order message generated by the order message generator 402, such as by purchaser message generator 506 and recipient message generator 508 respectively.

In some embodiments, a field may include multiple items of data. For instance, the field "shipping info" in templates 502a, 506a, and 508a may include some or all of the data: "Shipping name", "Shipping address", "Shipping telephone no.", and "Shipping email address" found in the order details 409.

In another example, the ninth row of the table including order details 409 stores the "Billing address" of the purchaser. As only the "Purchaser" tag is associated with this field, the content of this field is only presented in an order message for Al Smith on a purchaser device 430. This information will not be included in an order message generated by the recipient message generator 508 and transmitted to the recipient device 440 of Betty Lee. The billing address might be omitted entirely, or instead could be blurred, covered, or replaced with alternative text.

In one embodiment, the product may be purchased by a customer for themselves. The only recipient of the message is the purchaser. The processor 404 of the order message generator 402 only executes the purchaser message generator 506 of the secondary message generator 504, and uses the purchaser's electronic contact information (e.g. the purchaser's email address) to send a message having all fields from the master message tagged "Purchaser".

In another embodiment, the product is being purchased as a gift, and during checkout the purchaser provides the electronic contact information for the gift recipient via the purchaser device 430. In some embodiments, during the online checkout process, a purchaser may also configure obscuring rules, such as content modification rules for the message to be sent to the gift recipient. For example, at checkout the purchaser may select whether the product name is to be included in the confirmation message, or be completely omitted from the confirmation message, or be replaced with the generic title "Jewelry". The obscuring rules set by the purchaser may be saved by the order message generator 402 as part of the message rules 411.

The purchaser message generator 506 may use the purchaser's electronic contact information (e.g. purchaser's email address) to send a message having all fields from the master message tagged "purchaser". The recipient message generator 508 may use the gift recipient's electronic contact information (e.g. the recipient's email address) to send a message having all fields from the master message tagged "Recipient" or "Recipient-modify", and applies one or more content modification rules to the fields tagged "Recipient-modify".

Figure 7:

FIG. 7 illustrates an example user interface providing a purchaser with a checkout page of an online purchase of a gift, according to one embodiment. Web content 700 in the form of a checkout page of an online store 138 may be displayed to the purchaser through the user interface 438 of their purchaser device 430. The web content 700 may allow the purchaser to enter order details 409 that are stored in memory 408 following the completion of order. As well, the web content 700 may include a checkbox 702, which, when selected, provides an indication to the order message generator 402 that the product being purchased is a gift.

For example, the web content 700 may be a checkout page for an online store called "The Jewelry Store", through which Al Smith is purchasing a bracelet for his friend Betty Lee. Al Smith may use his purchaser device 430 to enter in his billing information and the shipping information required to deliver the bracelet to Betty Lee. Al Smith may also select checkbox 702 to indicate that the bracelet being purchased is a gift. As part of the billing information, Al Smith enters his email address, "al_smith@examplemail.com", and the recipient's email address "betty_lee@examplemail.com", such that the order message generator 402 is able to transmit order messages to the purchaser and recipient, respectively. The information entered into the fields of web content 700 are saved as part of the order details 409. The order details 409 may be stored in memory 408 in a table, such as the table of FIG. 6.

In some embodiments, the indication that the product being purchased is a gift might not be provided in the form of the checkbox 702, but may appear in a different form, e.g. a selectable button.

FIG. 8 illustrates another example user interface providing a purchaser with a checkout page of an online purchase of a gift, according to one embodiment. The content within the interface of FIG. 8 may be provided to the purchaser via the purchaser device 430 after selecting the "Next" arrow on the checkout page of FIG. 7. The content within the interface of FIG. 8 provides a summary of the billing information and shipping information entered by Al Smith. As well, the checkout page states that this purchase has been marked as a gift, and includes further web content 800. The further web content 800 allows the purchaser to select obscuring rules for content of fields stored as part of the order details 409.

The further web content 800 in FIG. 8 includes the following two prompts: "In emails to the recipient, please omit the following information:" and "In emails to the recipient, please modify the following information:", which allow the purchaser to select obscuring rules. Following each prompt, there is provided a list of fields and checkboxes. Selecting a checkbox may provide the order message generator 402 with an indication as to which tag to apply to each of the fields in the order details 409, and may provide obscuring rules to be stored in the message rules 411. For instance, following the prompt regarding omitting information, the checkboxes beside the fields "Purchaser name" and "Product price" have been selected, indicating that these fields are to be assigned the "Purchaser" tag only, and are not to be included as part of a message sent to the recipient. In some embodiments, the checkboxes "Purchaser name" and "Product price" may be automatically checked by default in the web content on the premise that a purchaser might not want to include such information in a recipient message. In some embodiments, certain checkboxes may be automatically checked by default and the purchaser may be unable to uncheck them on the premise that they are associated with personal information relating to the purchaser that should not be permitted to be seen by the recipient. For example, although not shown in FIG. 8, there may be a checkbox "Billing information" or "Payment information" or the like, which may be checked by default to omit in the recipient message, and the purchaser may be unable to uncheck them.

In some embodiments, the further web content 800 may include a space to enter alternative text for fields the purchaser has selected to modify. In other embodiments, the merchant may determine the modified content for the fields that the purchaser has selected to modify.

In some embodiments, the further web content 800 may allow the purchaser to select an option indicating that they do not want the gift recipient to receive electronic messages in response to the post-purchase events. Selecting such an option may provide an indication to the order message generator 402, which may store this indication in the message rules 411. Subsequently, the order message generator 402 may instruct the recipient message generator 508 not to generate a recipient electronic message.

The further web content 800 in FIG. 8 is only an example of an interface that allows the purchaser to select obscuring rules to be transmitted to the order message generator 402. The appearance, content, and other features of the interface are not limited to the interface shown in FIG. 8 and may be embodied in any manner that allows the purchaser to provide indications to the order message generator 402 for obscuring rules, via their purchaser device 430.

In another embodiment, when adding a product to their online store, the merchant may decide the tags and/or obscuring rules, such as content modification rules. For example, the merchant may select, via their merchant device 420, which fields to obscure for which message recipients. However, the order message generator 402 may impose restrictions to ensure privacy and security, e.g. the purchaser's billing details may never be included in a message for a gift recipient.

In one example, an obscuring rule may be set by the merchant for all the merchant's products to replace "We have received your order" to "A gift will soon be coming your way" in all messages directed to gift recipients. As another example, a content modification rule may be set by the purchaser on checkout to replace "Women's Charm Bracelet" with "Jewelry" or "It's a surprise!" in any message directed to gift recipients.

In alternative embodiments, an API or a different interface may be used in communication with the order message generator 402 to determine which tag to apply to each of the fields in the order details 409, and may be used to provide obscuring rules to be stored in the message rules 411.

Figure 9:
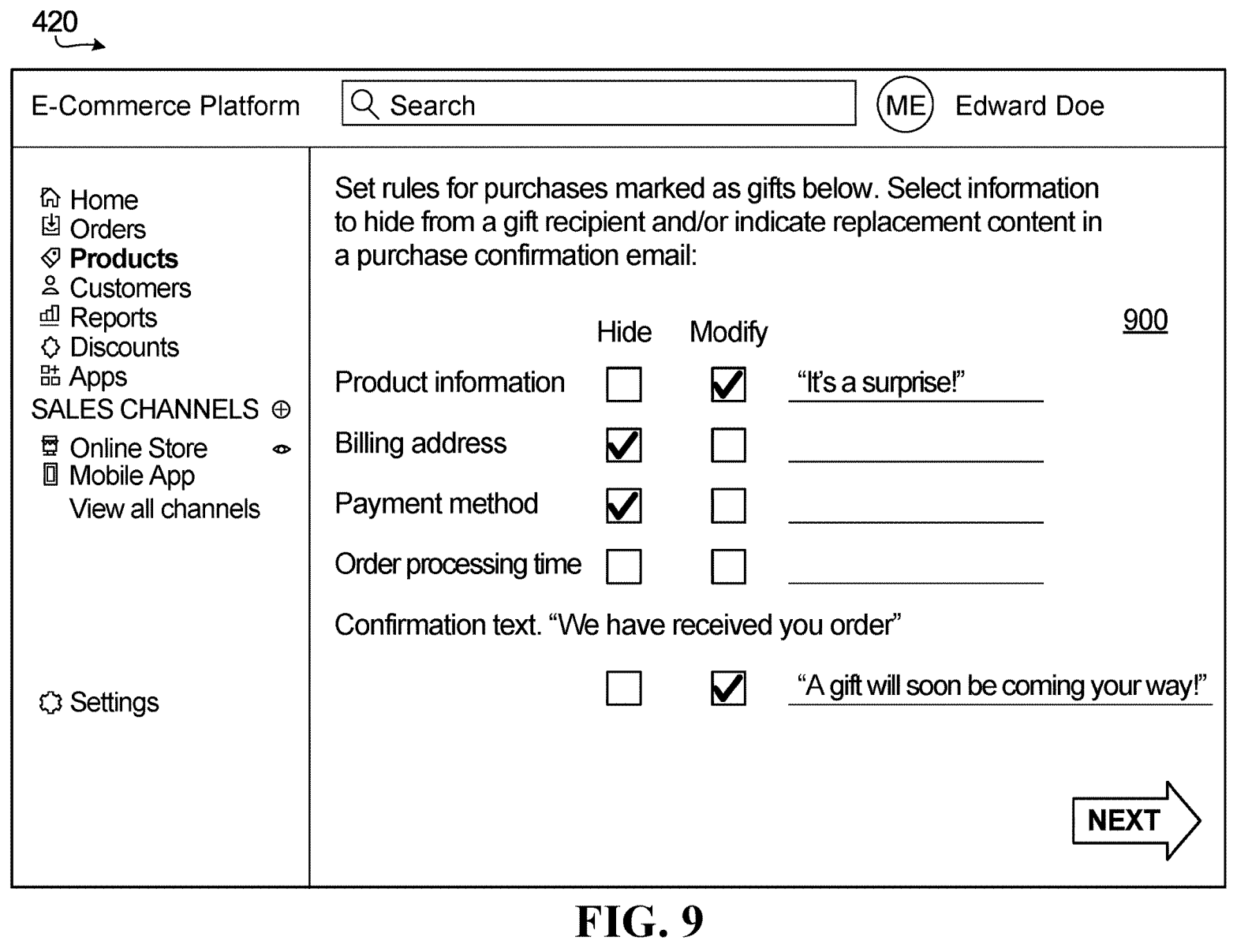

FIG. 9 illustrates an example user interface on which a merchant may set obscuring rules, according to one embodiment. Web content 900 may be presented to a merchant through the user interface 428 of the merchant device 420. The web content 900 prompts the merchant to set obscuring rules for purchases from their online store that are marked as gifts. The web content 900 in FIG. 9 allows the merchant to select information to hide from a gift recipient and/or indicate replacement content in an order confirmation email sent to the recipient. Different types of information are listed within the web content 900, such as "Product information" and "Billing address". These types of information correspond to the fields shown in the first column 602 of the order details 409 of FIG. 6. Beside the fields, there are provided two columns of checkboxes, labeled "Hide" and "Modify". Selecting the "Hide" checkbox beside a field provides an indication of an obscuring rule that omits the field from the recipient message. Selecting the "Modify" checkbox beside a field provides an indication of an obscuring rule that modifies the content stored within the field in a recipient message. The line beside the "Modify" checkbox column allows for the merchant to enter, via their merchant device 420, alternative text to replace the content of the field. The alternative text may be stored as part of the message rules 411 in memory 408.

For example, the merchant may opt to obscure the product information, which may be the name of the product, in a confirmation email sent to a gift recipient. Therefore, the merchant may select the "Modify" checkbox beside field "Product information". The merchant may choose to replace the product name with the text: "It's a surprise!", and may type this text in the specified location in the web content 900. Once submitted, the order message generator 402 may assign the product information with the tags "Purchaser" and "Recipient-modify" as shown in the second row of the order details 409 table of FIG. 6. The obscuring rule indicating how the product information is to be modified may be stored in the message rules 411 stored in memory 408.

As another example, the merchant may opt to omit all billing and payment information in the message sent to the gift recipient. As such, the merchant may select, through the use of their merchant device 420, the "Hide" checkboxes beside the fields: "Billing address" and "Payment method" in the web content 900. Once submitted, the order message generator 402 may assign the billing address and payment method fields with only the tag "Purchaser", as shown in the ninth and tenth rows of the order details 409 table of FIG. 6. These obscuring rules, indicating the omission of these fields from an order recipient message, may be stored in the message rules 411.

In some embodiments, the merchant may be able to select obscuring rules, including content modification rules, for content that may be presented to the purchaser.

In some embodiments, suggestions for alternative text or methods of obscuring content may be provided for the merchant to select from. For example, a list of content modifications may be provided to the merchant via the web content 900 via a drop-down list.

In some embodiments, different web content (e.g. a series of different web pages) may be provided to allow the merchant to select obscuring rules for each type of order message in response to a post-purchase event, such as a notification of shipping or delivery, provided to the purchaser and/or recipient. In other embodiments, there may be one instance of web content (e.g. a single web page) provided to the merchant in which the merchant is to select all rules for obscuring content across all order messages provided to the purchaser and/or recipient of the gift.

In some embodiments, the web content 900 may allow the merchant to select whether or not the merchant wants to allow electronic messages transmitted in response to an event post-purchase to be provided to the gift recipient. This selection may be provided to the order message generator 402 and stored in the message rules 411. The order message generator 402 may then instruct the recipient message generator 508 to abstain from generating a recipient message.

In some embodiments, the web content 900 may allow the merchant to select whether or not the purchaser is able to configure obscuring rules when purchasing the gift. For example, a merchant may configure an order checkout page, such as checkout page 700, that might not include the further web content 800.

In some embodiments, the obscuring rules selectable by the purchaser while purchasing the gift via further web content 800 on the checkout page 700 might only apply to fields for which the merchant has not provided an obscuring rule.

In another embodiment, the obscuring rules selected by the purchaser while purchasing the gift via further web content 800 on the checkout page 700 may override the obscuring rules set by the merchant via web content 900, and may replace the rules set by the merchant in the message rules 411 stored in memory. The overriding of the obscuring rules set by the merchant may be enabled by selecting an indication provided to the merchant in the web content 900.

Although the web content 900 is presented to the merchant in FIG. 9 as part of the configuration of a store through an e-commerce platform, such as e-commerce platform 100 of FIGS. 1 and 3, the web content 900 may also or instead be presented to the merchant in another manner. For example, web content 900 may be provided to the merchant through an application or web plugin including at least part of the order message generator 402.

The web content 900 in FIG. 9 is only one example of an interface that allows the merchant to configure obscuring rules for content to be provided as part of order messages sent to a gift purchaser and/or a gift recipient. The interface is not limited to the appearance, text, or content provided in the example web content 900.

By generating the message for the gift recipient in the manner described above, assigned tags may be used to obscure content from the gift recipient. The obscuring may be implemented by omission of the content in the message (e.g. omitting content not tagged for the gift recipient), by masking or obfuscation (e.g., by blurring or placing content such as a black box or an "X" over text or images), or by replacing the content with something different, e.g. something more generic (e.g. via an obscuring rule that instructs the modification of the content).

Figure 10:
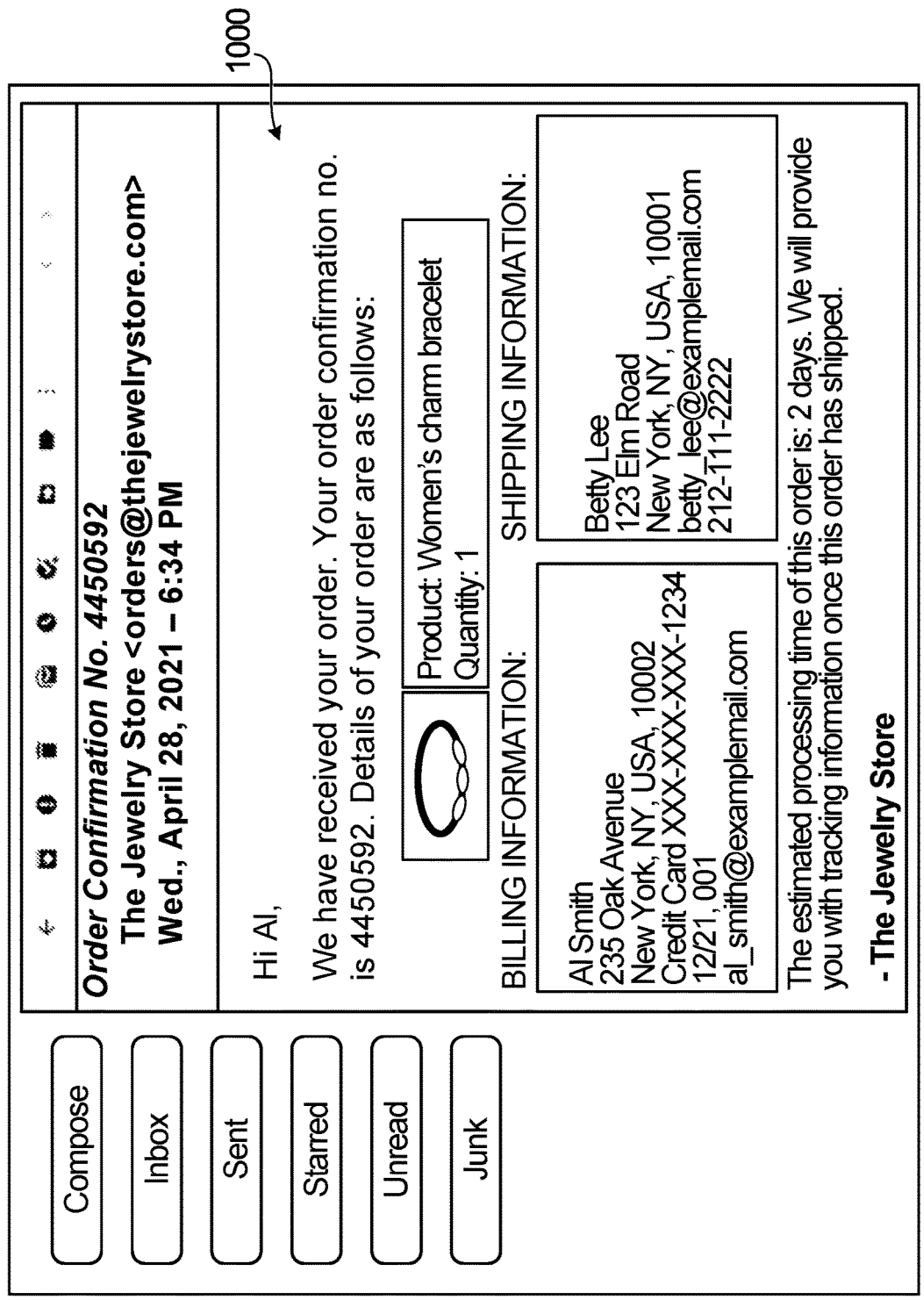
FIG. 10 illustrates an example user interface providing a generated order message to a purchaser, according to one embodiment.
Figure 11:
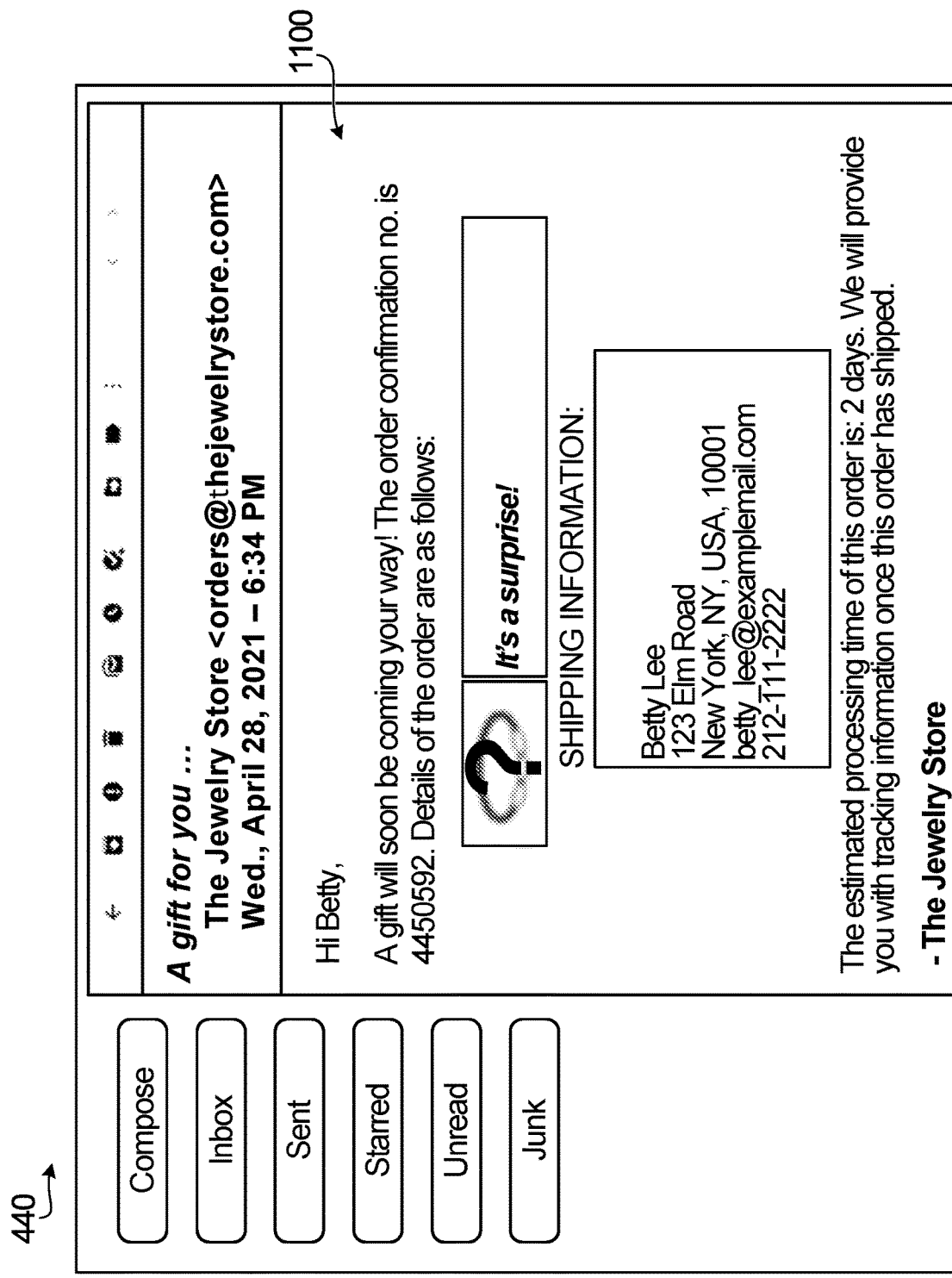
FIG. 11 illustrates an example user interface providing a generated order message to a recipient, according to one embodiment; and, FIG. 12 illustrates steps of a computer-implemented method, according to one embodiment.

Examples of possible differences between the purchaser and recipient messages generated by the order message generator 402 and transmitted to the purchaser and the gift recipient are shown in FIGS. 10 and 11.

FIG. 10 illustrates an example user interface providing a generated order message to a purchaser. The generated order message is in the form of email 1000, which is displayed to the purchaser via the user interface 438 of the purchaser device 430. In FIG. 10, the email 1000 is an order confirmation message sent to Al Smith's purchaser device 430 regarding his purchase of a women's charm bracelet as a gift for Betty Lee.

The master message used to ultimately generate the message of the email 1000 may have initially been created using the master message generator 502. The purchaser message generator 506 of the secondary message generator 504 may then generate the version of the message to send to purchaser device 430. The master message generator 502 may have created the master message template 502*a* of FIG. 5, which provides the "skeleton" of the message and indications of which fields are to be included in the order confirmation message. The purchaser message generator 506 generates the purchaser message template 506*a*, which, when populated with the field data of the order details 409 of FIG. 6, forms the body of the email 1000.

The email 1000 includes the content in the order details 409 for each of the fields in the purchaser message template 506*a*. In FIG. 10, the email 1000 is addressed to the purchaser, and includes: the text "We have received your order", the order confirmation number, the product name and image, the billing information associated with Al Smith, the shipping information associated with Betty Lee, and the order processing time. None of the fields shown in the master message template 502*a* in FIG. 5 are obscured or hidden from Al Smith in the email 1000.

FIG. 11 illustrates an example user interface providing a generated order message to a gift recipient. The email 1100 of FIG. 11 is the counterpart order confirmation email of FIG. 10, but provides the message displayed to the gift recipient through the user interface 448 of the recipient device 440. The email 1100 is based on the same master message template 502*a* as email 1000, but includes less and/or different data than in the email 1000 sent to the purchaser. In FIG. 11, the email is an order confirmation message sent to Betty Lee's recipient device 440 regarding the gift Al Smith has purchased for her.

The email 1100 sent to Betty Lee may have been generated using the master message generated by master message generator 502. The recipient message generator 508 of the secondary message generator 504 may use the master message to generate the version of the message to send to recipient device 440. The same master message template 502*a* of FIG. 5 that forms the body of email 1000 may be used in the generation of email 1100. However, recipient message template 508*a* generated by the recipient message generator 508 might include only the indications of fields assigned recipient tags, including fields having content to be modified. The recipient message template 508*a*, and the subsequent population of content within it, is determined by the message rules 411 stored in memory 408. Certain fields are omitted from the recipient message template 508*a*, such that these fields are later omitted from email 1100. For example, email 1100 does not include Al Smith's billing information.

The email 1100 includes the field data stored in the order details 409 for the fields of the recipient message template 508*a* that are not tagged to be modified. For fields that are tagged to be modified, the content of the field may be determined by content modification rules, such as those stored in message rules 411. For instance, the field containing the text "We have received your order" in the email 1000 in FIG. 10 may be replaced with the text: "A gift will soon be coming your way!" in the email 1100 to the recipient, based on a content modification rule. As another example, in FIG. 5, the product name is assigned a tag that indicates it is to be modified for the recipient. Consequently, the email 1100 sent to the recipient device 440 obfuscates product information by: replacing the product name with the text "It's a surprise!"; blurring the product image; and, placing a question mark over the blurred product image.

The remainder of the body of the email 1100 is the same as the body of the email 1000 sent by the message order generator 402 to the purchaser. The order details 409 are used to populate the fields: "Order no.", "Shipping info", and "Processing time" that have been assigned tags associated with both the purchaser and the recipient.

By implementing embodiments described above, one or more of the following technical benefits may be provided. A master message generator, such as the master message generator 502, can generate a message without having regard to: possible recipients of the message, whether the order is a gift, and obscuring rules that may be applied by a merchant and/or a purchaser during checkout. The message can therefore be generated efficiently (thereby saving computer resources), and possibly without having access (e.g. for security reasons) to recipient electronic contact information, which may even allow for the computer resources to be outsourced or implemented in a less secure manner. Moreover, the master message generated may still be suitable in content for most cases in which the purchased product is not a gift. The secondary message generator 504 then receives the master message, determines the individuals to receive order messages, and applies the content obscuring according to the tags in the master message, with any custom content modification (e.g. selected by the purchaser and/or merchant) implemented on a purchase-by-purchase basis. If the purchaser has purchased the product for themselves, the purchaser message generator 506 of the secondary message generator 504 transmits the sections of the master message tagged "Purchaser", which may amount to simply sending the message content as generated by the master message generator 502. However, if there is a gift recipient, the recipient message generator 508 of the secondary message generator 504 may generate, from the master message, a version of the message that includes the content tagged as "Recipient", and applying the specific content modification rules that may have been selected by the merchant or the purchaser. For example, if the purchaser in one instance on checkout requested that "Women's Charm Bracelet" be replaced with "Jewelry", then the recipient message generator 508 would apply such a content modification, whereas if another purchaser in another instance on checkout requested "Women's Charm Bracelet" be replaced with "It's a surprise!", then the recipient message generator 508 would apply that content modification.

In some embodiments, the order message may be sent to one purchaser and one gift recipient. However, this is only an example. In other embodiments, order messages may be provided to multiple interested parties, each with their own tags in the master message generated by the master message generator 502. For example, a post-purchase message associated with a gift for a minor may result in the generation of three particular messages derived from the master message: a message for the purchaser including one level of detail (e.g. billing information), a message for the minor including another level of detail (e.g. an indication that a gift is coming), and a message for the parent including a different level of detail (e.g. an indication of what the gift is, but with no billing information). In this embodiment, the secondary message generator 504 of FIG. 5 may include the purchaser message generator 506, and two different recipient message generators, one corresponding to the minor and the other corresponding to the parent.

In the examples discussed earlier, every field in the master message is tagged "Purchaser". In other examples, some fields only of interest to the recipient (e.g. product care instructions) might not be tagged to the purchaser. In some embodiments, a field may be tagged "Product recipient" in which case it is included in the message sent to the product recipient independent of whether that product recipient is the purchaser or a gift recipient.

Example Methods

Figure 12:
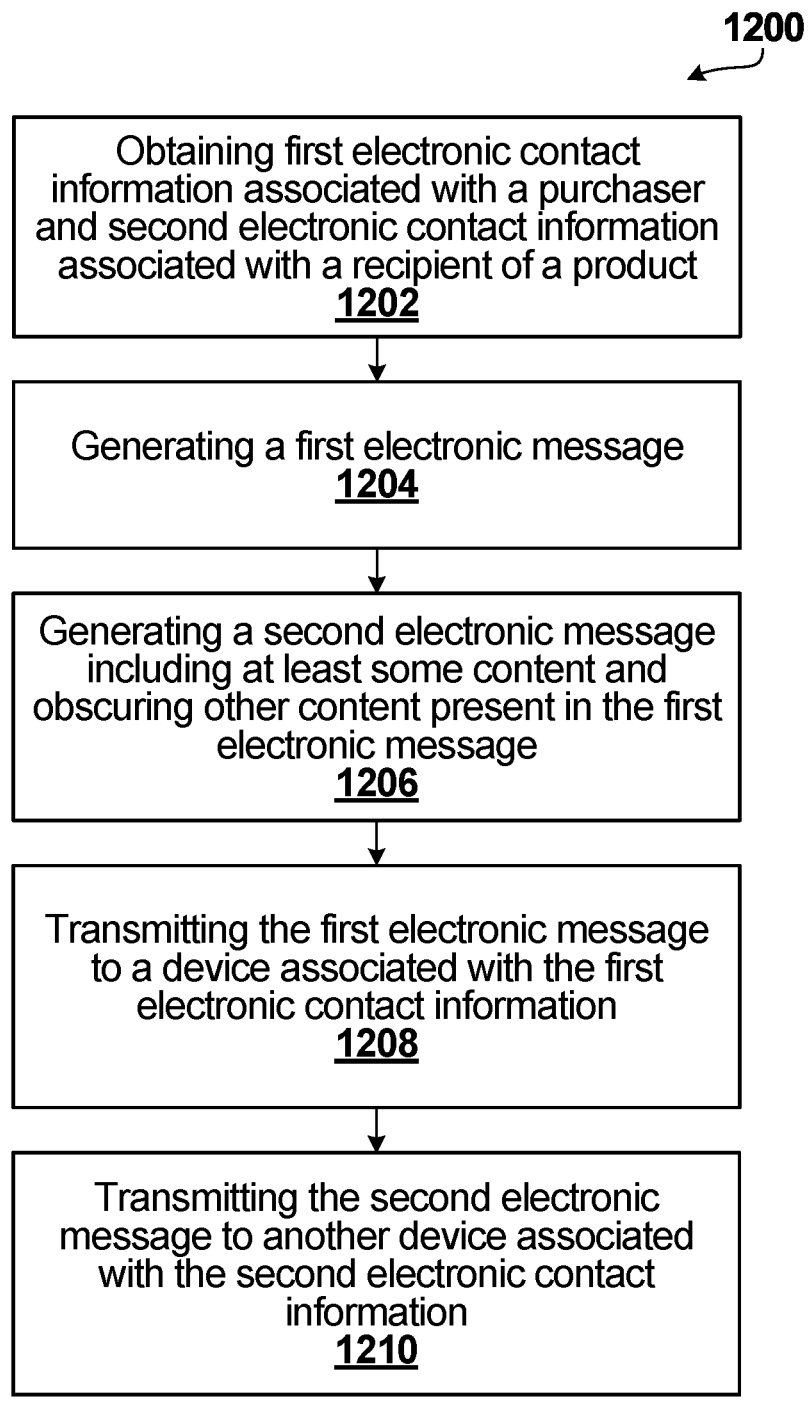

FIG. 12 illustrates a computer-implemented method 1200, according to one embodiment. Not all of the steps in the method 1200 of FIG. 12 are necessary in all embodiments. Also, some of the steps may be substituted by other steps instead. The method may be performed by or on an e-commerce platform, such as e-commerce platform 100, although this is not necessary. In method 1200, the steps are described as being performed by the processor 404 of order message generator 402 of FIG. 4, but this is only an example. For example, the method 1200 may instead be performed by another entity, which might or might not be part of an e-commerce platform.

At step 1202, first electronic contact information associated with a purchaser of a product and second electronic contact information associated with a recipient of the product is obtained. The first electronic contact information may be an email address of the purchaser and the second electronic contact information may be the email address of the gift recipient. The electronic contact information may be stored as part of the order details 409 in the memory 408 of the order message generator 402. The electronic contact information may be obtained by the order message generator 402 via the purchaser device 430. The purchaser may enter the purchaser and recipient electronic contact information through the user interface 438 of the purchaser device 430 while checking out during the electronic purchase of a gift, and the purchaser device 430 may transmit this electronic contact information to the order message generator 402.

For example, Al Smith may purchase a women's charm bracelet as a gift for his friend, Betty Lee, from the online store "The Jewelry Store". While purchasing the bracelet using his purchaser device 430, Al Smith may encounter a checkout page, such as checkout page 700 in FIG. 7. On the checkout page 700, Al Smith may enter his email address, "al_smith@examplemail.com", as part of the billing information. This email address may be the first electronic contact information. Al Smith may also enter Betty Lee's email address, "betty_lee@examplemail.com", as part of the shipping address on the checkout page 700, which may be the second electronic contact information. Once Al Smith completes the checkout process, the email addresses he has entered may be transmitted to the order message generator 402 and stored as part of the order details 409, as shown in the example order details table of FIG. 6.

In general, the purchaser of the product is different from the recipient of the product, and first electronic contact information is different from the second electronic contact information. The purchaser of the product and the recipient of the product are not the same individual, e.g. the purchaser is a first individual purchasing a product as a gift to be delivered to a second individual. This does not necessarily need to be the case in all implementations, e.g. the purchaser and the recipient might be the same and/or the first and second electronic contact information might be the same.

At step 1204, the processor 404 generates a first electronic message. The first electronic message may be a message that is generated for the purchaser of the gift, and may include information that is associated with the purchase. The first electronic message may be generated by the purchaser message generator 506 in FIG. 5.

For example, the first electronic message may be an order confirmation message in an email to Al Smith, such as email 1000 in FIG. 10. The body of the email 1000 is generated by the order message generator 402 in response to an event post-purchase, such as confirmation that The Jewelry Store has received Al Smith's order for a women's charm bracelet. The processor 404 of the order message generator 402 may instruct message generation in accordance with the message generators of FIG. 5. Ultimately, the first message generated for the purchaser may be the message generated by the purchaser message generator 506. The first message generation may include populating the purchaser message template 506*a* with all of the relevant information stored in the order details 409, which was entered by Al Smith in the checkout page 700.

In some embodiments, the first electronic message has a plurality of fields, and each field of the plurality of fields may carry respective content. For example, in FIG. 5 the purchaser message template 506*a* has fields: purchaser name, the text "We have received your order", the order number, the product, the billing information, the shipping information, and the order processing time. Each of these fields are stored in the first column 602 of the order details 409 in FIG. 6. In the second column 604 of FIG. 6, there is field data corresponding to the field in each row of the first column 602. The field data acts as the content that is carried by each of the fields of the first electronic message generated by the order message generator 402.

At step 1206, the processor 404 generates a second electronic message that includes at least some content present in the first electronic message and obscures other content present in the first electronic message. The second electronic message may be a message that is generated for the gift recipient, and may include a subset of the information associated with the purchase of the gift. The second electronic message may be generated by the recipient message generator 508 in FIG. 5. The second electronic message meant for the recipient obscures some of the content that is included in the counterpart message sent to the purchaser. For instance, the second electronic message might not include any of the billing information, as this may be private to the purchaser. Other information that might not be relevant to the recipient may also be hidden.

In some embodiments, the obscuring of some content in the second electronic message may be informed by message rules 411 stored in memory, which may be provided to the order message generator 402 by either the merchant or the purchaser during the checkout process.

For example, the second electronic message may be an order confirmation message sent in an email to Betty Lee, such as email 1100 in FIG. 11. The body of the email 1100 is generated by the order message generator 402 in response to an event post-purchase, such as confirmation that The Jewelry Store has received Al Smith's order for a women's charm bracelet. The processor 404 of the order message generator 402 may instruct message generation in accordance with the message generators of FIG. 5. The second electronic message generated for the recipient may be the message generated by the recipient message generator 508. The second electronic message generation may include populating a recipient message template 508*a* with some of the information stored in the order details 409, which was entered by Al Smith in the checkout page 700.

However, as can be seen in the purchaser and recipient message templates 506*a* and 508*a*, respectively, and the emails 1000 and 1100, respectively, the recipient message template 508*a* and the recipient email 1100 do not include all of the information found in the counterpart purchaser message template 506*a* and the purchaser email 1000. For example, the second electronic message generated for Betty Lee does not include Al Smith's billing information. As well, some of the information in the purchaser email 1000 is obscured in the recipient email 1100. For example, the product name and image are shown as part of the email 1000 generated for Al Smith. Conversely, in the email 1100 generated for Betty Lee, the product name is replaced with the text: "It's a surprise!" and the product image is blurred.

At step 1208, the processor 404 transmits the first electronic message to a device associated with the first electronic contact information. The first electronic message may be generated by the purchaser message generator 506 may be transmitted by the order message generator 402 to the purchaser device 430. The order message generator 402 may send the transmission through the network interface 406 to the purchaser device 430, possibly via an intermediary device, e.g. via an email server.

For example, the first electronic message may be the order confirmation email 1000 of FIG. 10 that is sent to Al Smith after purchasing a gift for Betty Lee. The email 1000 may be sent to Al Smith based on the first electronic contact information, e.g. his email address: "al_smith@examplemail. com", entered by Al Smith through checkout page 700 in FIG. 7 and stored as part of the order details 409 of FIG. 6. Al Smith may receive the email 1000 through his purchaser device 430.

At step 1210, the processor 404 transmits the second electronic message to another device associated with the second electronic contact information. The second electronic message may be generated by the recipient message generator 508 and may be transmitted by the order message generator 402 to a device associated with the second electronic information, which may be the recipient device 440. The order message generator 402 may send the transmission through the network interface 406 to the recipient device 440, possibly via an intermediary device, e.g. via an email server.

For example, the second electronic message may be the order confirmation email 1100 of FIG. 11 that is sent to Betty Lee after the purchase of a gift for her by Al Smith. The email 1100 may be sent to Betty Lee based on the second electronic contact information, e.g. her email address: "betty_lee@examplemail.com", entered by Al Smith through checkout page 700 in FIG. 7 and stored as part of the order details 409 of FIG. 6. Betty Lee may receive the email 1100 through her recipient device 440.

In some embodiments, the obtaining of the first electronic contact information and the second electronic contact information at step 1202 may occur during an online checkout process. The obtaining may include transmitting web content to allow for entering of an email address of the purchaser, and to allow for selection of an indication that the product is a gift. The obtaining may also include receiving, responsive to the web content, the indication that the product is a gift and indications of at least: the email address of the purchaser and an email address of the recipient. The email address of the purchaser may be stored as the first electronic contact information in memory 408, and the email address of the recipient may be stored as the second electronic contact information in memory 408.

For example, while Al Smith is purchasing a women's charm bracelet as a gift for Betty Lee, the checkout page 700 of FIG. 7 may be web content that is transmitted to his purchaser device 430. Al Smith may interact with checkout page 700 to enter his email address as part of the billing information, and Betty Lee's email address as part of the shipping information. Al Smith may select checkbox 702 to indicate that the product being purchased is a gift. The information collected via checkout page 700 may be provided to the order message generator 402, and Al Smith and Betty Lee's email addresses may be stored as part of the order details 409, as shown in FIG. 6.

In some embodiments, the obtaining of the first electronic contact information and the second electronic contact information at step 1202 may further include, in response to the receiving the indication that the product is a gift, a step of transmitting further web content to allow selection of one or more rules from amongst a plurality of rules for obscuring particular content present in the first electronic message from the second electronic message. The obtaining at step 1202 may also include, responsive to the further web content, receiving an indication of the selection of the one or more rules from amongst the plurality of rules. The generation of the second electronic message may include obscuring the particular content present in the first electronic message from the second electronic message based on the selection.

For example, Al Smith may be provided with checkout page 700 of FIGS. 7 and 8 via his purchaser device 430. On the checkout page 700 of FIG. 7, Al Smith may select the checkbox 702 that indicates that the women's charm bracelet he is purchasing is a gift, and this indication is provided to the order message generator 402. When clicking on the "Next" arrow icon, the order message generator 402 may, in response to receiving the indication that the product is a gift, provide Al Smith with further web content 800 on the checkout page 700 in FIG. 8. The further web content 800 allows Al Smith to select one or more fields of information that he might not want provided to Betty Lee in a message sent to her regarding the gift purchase. The further web content 800 provides Al Smith with the option to omit fields and to modify the content of particular fields, which is achieved by the methods described herein. The selections made in the further web content 800 may be stored in the memory 408 of the order message generator 402 as the message rules 411. The order confirmation email sent to Betty Lee may omit some of the content that is part of the order confirmation email sent to Al Smith, or may include some modified content, based on the rules selected by Al Smith via the further web content 800 during the checkout process.

In some embodiments, obscuring the other content present in the first electronic message comprises at least one of: omitting particular content present in the first electronic message, masking the particular content, or generating modified content to replace the particular content. The order message generator 402 may obscure content in the second electronic message based on the message rules 411 stored in the memory 408. The message rules 411 may indicate that particular content that is present in the first electronic message may be omitted in the second electronic message, may be modified to be replaced with alternative text, may be covered, etc.

For example, Al Smith may indicate in the further web content 800 on the checkout page 700 of FIG. 8 that his billing address is to be omitted from an electronic message sent to the gift recipient. Therefore, the order message generator 402 does not assign a "Recipient" tag to this data in the order details 409, and the recipient message generator 508 does not include an indication of this field. The email 1100 sent to the recipient device 440 of Betty Smith does not include Al Smith's billing information based on this particular obscuring rule defined by Al Smith during checkout.

As another example, Al Smith may indicate in the further web content 800 on the checkout page 700 of FIG. 8 that the product information is to be modified in an electronic message sent to the gift recipient. Either Al Smith or the merchant may determine how the content is modified, this information may be stored in the message rules 411 in memory 408, and the product field in the order details 409 may be assigned with the tag "Recipient-modify". In FIG. 11, the email 1100 sent to the recipient may show the product name modified to be replaced with the text: "It's a surprise". The product image may be modified to be masked through blurring, and covered with a question mark.

In some embodiments, the first electronic message includes information private to the purchaser, and the second electronic message obscures the information private to the purchaser. In some embodiments, particular fields might be unsuitable for the recipient, and therefore the content of these fields will then only be included as part of the first electronic message. For instance, information that includes the purchaser's personal information, such as their payment method and billing address, might not be appropriate to provide as part of an electronic message sent to the gift recipient. The obscuring rules for the private information may be determined by the purchaser at checkout, or may be predetermined by the merchant selling the product being purchased.

For example, Al Smith's billing address and payment information is private information that is not to be shared with the gift recipient. The order message generator 402 omits this information from the order confirmation email sent to Betty Lee. In FIG. 11, the email 1100 does not include Al Smith's billing information.

In some embodiments, the information private to the purchaser includes at least one of: sensitive information, personally identifiable information, or payment-related information.

In some embodiments, the method 1200 may further include generating a master message including multiple fields. Each field of the multiple fields may include at least one of: a first tag that corresponds to the purchaser, a second tag that corresponds to the recipient, or a third tag indicating that a content modification rule of one or more content modification rules applies. The first electronic message may include the content of the multiple fields assigned the first tag. The second electronic message may include the content of any of the multiple fields that are assigned the second tag and modified content for any of the multiple fields that are assigned the third tag.

For example, the order message generator 402 may generate messages as set out in FIG. 5, in which the master message generator 502 is first used to generate a master message template 502a. The master message template 502a includes an indication of which fields are to be included as part of a generated order message, and where they are to be included. Each of the fields is assigned at least one of the tags: "Purchaser", "Recipient", and "Recipient-modify", corresponding with the first, second, and third tags, respectively. The tags assigned to each field may be stored as part of the order details 409 in memory 408, as shown in FIG. 6.

In an example, all of the fields of the master message template 502a in FIG. 5 are assigned the first tag associated with the purchaser. The fields "order no.", "shipping info", and "processing time" are also assigned the second tag associated with the recipient. The field "product", and the field including the text "We have received your order" are assigned the third tag, indicating that the content of the field is to be modified based one or more of the message rules 411. The first electronic message may be the order confirmation email 1000 sent to Al Smith in FIG. 10, and includes the content stored in the order details 409 associated with the fields assigned the "Purchaser" tag. The second electronic message may be the order confirmation email 1100 sent to Betty Lee in FIG. 11, and includes the content stored in the order details 409 associated with the fields assigned the "Recipient" tag, as well as modified content of the fields assigned the "Recipient-modify" tag.

In a more specific example, the field "product" in FIGS. 5 and 6 is assigned the first tag associated with the purchaser and a third tag indicating that the field is to be modified for the recipient. The purchaser message template 506a may include the field "product" and the recipient message template 508a may include the field "product-modify". The first electronic message may be the order confirmation email 1000 sent to Al Smith in FIG. 10 and may include the field data associated with the product field that is shown in the order details 409 of FIG. 6. The second electronic message may be the order confirmation email 1100 sent to Betty Lee in FIG. 11 and may include modified field data associated with the product field. The way in which the field data is modified may be determined by the message rules 411 stored in the memory 408.

In some implementations, for each field of the plurality of fields that is assigned the third tag, the modified content for the field is generated based on the content modification rule to replace original content of a corresponding field of the master message. For example, for a field that has been assigned the tag "Recipient-modify" in the order details 409 of FIG. 6, the way in which the content is to be modified may be stored as part of the order rules 411, which are also stored in memory. For instance, the purchaser may set the obscuring rule, via the further web content 800 on the checkout page 700, that the product information is to be modified for messages sent to the recipient. The purchaser may indicate that the product name is to be replaced with the alternative text: "It's a surprise!". The field for the product information in the recipient message template 508a is then populated with the alternative text as stored in the order rules 411. This results in the email 1100 of FIG. 11 replacing the product name with the text: "It's a surprise!".

In some embodiments in which the method 1200 includes generating a master message, the method 1200 may further include transmitting web content to at least one of: a merchant device 420 associated with a merchant of the product, or a user device associated with the purchaser. The method 1200 may also include receiving, responsive to the web content, an indication of one or more rules for obscuring particular content present in the first electronic message from the second electronic message. As well, the method 1200 may include assigning at least one tag to one or more fields of the master message based on the one or more rules.

In one example, the user device associated with the purchaser may be the purchaser device 430. The web content transmitted by the order message generator 402 may be the further web content 800 on checkout page 700, as shown in FIG. 8. The further web content 800 may allow the purchaser to input obscuring rules by selecting fields to omit or modify in the message provided to the gift recipient. When completing the checkout process, an indication of the obscuring rules may be received by the order message generator 402. The obscuring rules may be saved as message rules 411 in memory and used to assign tags to the fields in the order details 409.

In another example, the web content transmitted by the order message generator 402 may be the interface 900 provided to the merchant via the merchant device 420. The interface 900 may allow the merchant to select which fields to hide or modify in the second electronic message that is to be sent to the recipient of a gift that is purchased from the merchant online. For instance, the merchant may select a checkbox indicating that the billing address of the purchaser is to be hidden from the recipient. When the merchant clicks on the "Next" arrow on the interface 900, an indication may be provided to the order message generator of this selected obscuring rule, which may be stored in the message rules 411 and may be used to assign tags to fields in the order details 409 in memory 408.

In some implementations, at least one field that may be obscured in the second electronic message is assigned the first tag and/or the third tag. In some implementations, at least one field that may be obscured in the second electronic message might not be assigned the second tag. For example, the billing address is obscured through omission in email 1100 sent to the recipient. In the order details 409 of FIG. 6, the field "Billing address" is assigned only the "Purchaser" tag.

In some embodiments in which the method 1200 includes generating a master message, obscuring the other content that is present (and not obscured) in the first electronic message may include at least one of: omitting, in the second electronic message, the content of at least one field of the generated master message that is assigned the first tag and not assigned the second tag; masking, in the second electronic message, the content of at least one field of the generated master message that is assigned the first tag and not assigned the second tag; or replacing, in the second electronic message, the content of at least one field of the first electronic message with the modified content for at least one field of the generated master message that is assigned the third tag.

In an example, a field containing the purchaser billing information may be included in the master message template 502a, and the billing information might not be assigned a tag associated with the gift recipient. As a result, the message generated by the recipient message generator 508 of the order message generator 402 may omit the content associated with the billing information, as shown in the order confirmation email 1100 sent to the gift recipient in FIG. 11.

In another example, a field containing the text: "Your order has been confirmed" may be assigned the first tag associated with the purchaser and the third tag indicating that the content of the field is to be modified for the recipient. The text within the field may be modified based on the message rules 411 that were selected by either the purchaser or the merchant. An obscuring rule stored in the message rules 411 may include modifying the confirmation text field to provide: "A gift will soon be coming your way!", as shown in the order confirmation email 1100 sent to the gift recipient in FIG. 11.

In some embodiments, the first electronic message has a plurality of fields, each carrying respective content. The content of the plurality of fields may include at least one of: billing information of the purchaser; contact information of the purchaser; mailing address of the recipient; a name of the product; shipping information for the product; an indication confirming purchase of the product; or care instructions for the product. For example, the first electronic message generated by the purchaser message generator 506 of the order message generator 402 may include fields, such as those found in column 602 in the order details 409 of FIG. 6. The fields in the first column 602 each carry respective content, which might be the field data in the second column 604 in the order details 409 of FIG. 6.

For example, order details 409 includes the fields: "Purchaser name", "Billing address", "Payment method", "Billing telephone no.", and "Billing email address", which forms the billing information in the purchaser message template 506*a*, and the corresponding field data is used to populate the billing information in the email 1000 of FIG. 10 provided to the purchaser. The email 1000 sent to the purchaser also includes a field confirming the purchase of a product carrying the content: "We have received your order", and shipping information and processing time.

In some embodiments, the first electronic message may be a first email directed to the device associated with the first electronic contact information and the second electronic message may be a second email directed to the device associated with the second electronic contact information. Both the first email and the second email may provide at least one of: a confirmation message confirming the order was received and summarizing order details; a message indicating that the product has shipped; a message providing a shipping update; or, a message requesting submission of a review of the product. The first email may be an email sent to the purchaser using the purchaser's electronic contact information, and received using the purchaser device 430. The second email may be an email sent to the recipient using the recipient's electronic contact information, and received using the recipient device 440.

In an example, the first and second electronic messages may be a confirmation message confirming that Al Smith's order of a women's charm bracelet was received. The first electronic message may be the order confirmation email 1000 sent to Al Smith, and displayed in FIG. 10 via Al Smith's purchaser device 430. The second electronic message may be the order confirmation email 1100 sent to Betty Lee, the recipient of the women's charm bracelet, and may indicate that a gift has been purchased for her. The recipient email may be the email 1100 displayed in FIG. 11 via Betty Lee's recipient device 440.

In some embodiments, the generating of the first electronic message in step 1204 occurs in response to an event post purchase. More generally, the series of steps 1204 to 1210 may be triggered in response to an event post purchase. The order message generator 402 may wait for a particular event to occur after the purchaser has completed the checkout of a product in order to begin generating an order message. For example, the post-purchase event for the generation of an order confirmation message may be the receival of the order by the merchant. In some embodiments, the event post-purchase is order confirmation (e.g. receival of the order), and the first electronic message includes payment information and the second electronic message obscures the payment information.

In some embodiments, a system is provided for performing the methods described above. The system may include a memory (e.g. memory 408) to store information such as the first electronic contact information and the second electronic contact information, as well as some of the content that may be present in the first and second electronic messages. The system may further include at least one processor (e.g. processor 404) to perform operations such as: generating a first electronic message (e.g., using the purchaser message generator 506 of FIG. 5); generating a second electronic message (e.g., using the recipient message generator 508 of FIG. 5); and transmitting the first electronic message and the second electronic message to devices associated with the first and second electronic contact information, respectively (e.g., sending a message generated by the purchaser message generator 506 as an email to the purchaser device 430 and sending a message generated by the recipient message generator 508 as an email to the recipient). In some embodiments, the processor 404 may instruct transmission of an electronic message by sending the electronic message to the network interface 406 for transmission over the network.

In some embodiments, a computer-readable medium is provided having stored thereon computer-executable instructions that, when executed by a computer, cause the computer to perform method steps described above.

Conclusion

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
   obtaining first electronic contact information associated with a user and second electronic contact information associated with a recipient;
   generating a master message including multiple fields, each field of the multiple fields assigned at least one of: a first tag that corresponds to the user, a second tag that corresponds to the recipient, or a third tag indicating that a content modification rule of one or more content modification rules applies;
   generating a first electronic message, wherein the first electronic message includes the content of the multiple fields assigned the first tag;
   generating a second electronic message that includes at least some content present in the first electronic message and obscures other content present in the first electronic message, wherein the second electronic message includes the content of any of the multiple fields that are assigned the second tag and modified content for any of the multiple fields that are assigned the third tag;
   transmitting the first electronic message to a device associated with the first electronic contact information; and
   transmitting the second electronic message to another device associated with the second electronic contact information.

2. The computer-implemented method of claim 1, wherein the obtaining the first electronic contact information and the second electronic contact information comprises:
   transmitting web content to allow for entering of a first email address of the user, and to allow for selection of an indication;
   receiving, responsive to the web content, the selection of the indication and indications of at least: the first email address and a second email address of the recipient; and
   storing, in memory, the first email address as the first electronic contact information and the second email address as the second electronic contact information.

3. The computer-implemented method of claim 2, the method further comprising:
   in response to the receiving the selection of the indication:
   transmitting further web content to allow selection of one or more rules from amongst a plurality of rules for obscuring particular content present in the first electronic message from the second electronic message; and
   responsive to the further web content, receiving an indication of the selection of the one or more rules from amongst the plurality of rules,
   wherein the generation of the second electronic message includes obscuring the particular content present in the first electronic message from the second electronic message based on the selection.

4. The computer-implemented method of claim 1, wherein obscuring the other content present in the first electronic message comprises at least one of: omitting particular content present in the first electronic message, masking the particular content, or generating modified content to replace the particular content.

5. The computer-implemented method of claim 1, wherein the first electronic message includes information private to the user, and wherein the second electronic message obscures the information private to the user.

6. The computer-implemented method of claim 5, wherein the information private to the user includes at least one of: sensitive information, personally identifiable information, or payment-related information.

7. The computer-implemented method of claim 1, further comprising:
   transmitting web content;
   receiving, responsive to the web content, an indication of one or more rules for obscuring particular content present in the first electronic message from the second electronic message; and
   assigning at least one tag to one or more fields of the master message based on the one or more rules.

8. The computer-implemented method of claim 1, wherein obscuring the other content present in the first electronic message comprises at least one of:
   omitting, in the second electronic message, the content of at least one field of the generated master message that is assigned the first tag and not assigned the second tag;
   masking, in the second electronic message, the content of at least one field of the generated master message that is assigned the first tag and not assigned the second tag; or replacing, in the second electronic message, the content of at least one field of the first electronic message with the modified content for at least one field of the generated master message that is assigned the third tag.

9. The computer-implemented method of claim 1, wherein the first electronic message is a first email directed to the device associated with the first electronic contact information and the second electronic message is a second email directed to the another device associated with the second electronic contact information, and wherein both the first email and the second email provide a particular message.

10. The computer-implemented method of claim 1, wherein the generating the first electronic message occurs in response to an event.

11. A system comprising:
a memory to store first electronic contact information associated with a user and second electronic contact information associated with a recipient; and
at least one processor to:
generate a master message including multiple fields, each field of the multiple fields assigned at least one of: a first tag that corresponds to the user, a second tag that corresponds to the recipient, or a third tag indicating that a content modification rule of one or more content modification rules applies;
generate a first electronic message, wherein the first electronic message includes the content of the multiple fields assigned the first tag;
generate a second electronic message that includes at least some content present in the first electronic message and obscures other content present in the first electronic message, wherein the second electronic message includes the content of any of the multiple fields that are assigned the second tag and modified content for any of the multiple fields that are assigned the third tag;
instruct transmission of the first electronic message to a device associated with the first electronic contact information; and
instruct transmission of the second electronic message to another device associated with the second electronic contact information.

12. The system of claim 11, wherein the at least one processor is to:
instruct transmission of web content to allow for entering of a first email address of the user, and to allow for selection of an indication;
receive, responsive to the web content, the selection of the indication and indications of at least: the first email address and a second email address of the recipient; and
store, in memory, the first email address as the first electronic contact information and the second email address as the second electronic contact information.

13. The system of claim 12, wherein, in response to the receiving the selection of the indication, the at least one processor is further to:
instruct transmission of further web content to allow selection of one or more rules from amongst a plurality of rules for obscuring particular content present in the first electronic message from the second electronic message; and
responsive to the further web content, receive an indication of the selection of the one or more rules from amongst the plurality of rules,
wherein during generation of the second electronic message the at least one processor is to obscure the particular content present in the first electronic message from the second electronic message based on the selection.

14. The system of claim 11, wherein obscuring the content present in the first electronic message comprises at least one of: omitting particular content present in the first electronic message, masking the particular content, or generating modified content to replace the particular content.

15. The system of claim 11, wherein the first electronic message includes information private to the user, and wherein the second electronic message obscures the information private to the user.

16. The system of claim 11, wherein the at least one processor is further to:
instruct transmission of web content;
receive, responsive to the web content, an indication of one or more rules for obscuring particular content present in the first electronic message from the second electronic message; and
assign at least one tag to one or more fields of the master message based on the one or more rules.

17. The system of claim 11, wherein the at least one processor is to obscure the other content present in the first electronic message by performing operations comprising at least one of:
omitting, in the second electronic message, the content of at least one field of the generated master message that is assigned the first tag and not assigned the second tag;
masking, in the second electronic message, the content of at least one field of the generated master message that is assigned the first tag and not assigned the second tag; or
replacing, in the second electronic message, the content of at least one field of the first electronic message with the modified content for at least one field of the generated master message that is assigned the third tag.

18. The system of claim 11, wherein the first electronic message is a first email directed to the device associated with the first electronic contact information and the second electronic message is a second email directed to the another device associated with the second electronic contact information, and wherein both the first email and the second email provide a particular message.

19. The system of claim 11, wherein the at least one processor is to generate the first electronic message in response to an event.

20. A non-transitory computer readable medium having stored thereon computer-executable instructions that, when executed by a computer, cause the computer to perform operations comprising:
obtaining first electronic contact information associated with a user and second electronic contact information associated with a recipient;
generating a master message including multiple fields, each field of the multiple fields assigned at least one of: a first tag that corresponds to the user, a second tag that corresponds to the recipient, or a third tag indicating that a content modification rule of one or more content modification rules applies;
generating a first electronic message, wherein the first electronic message includes the content of the multiple fields assigned the first tag;
generating a second electronic message that includes at least some content present in the first electronic message and obscures other content present in the first electronic message, wherein the second electronic message includes the content of any of the multiple fields that are assigned the second tag and modified content for any of the multiple fields that are assigned the third tag;
transmitting the first electronic message to a device associated with the first electronic contact information; and
transmitting the second electronic message to another device associated with the second electronic contact information.

21. The non-transitory computer readable medium of claim 20, wherein the computer-executable instructions, when executed by the computer, cause the computer to obtain the first electronic contact information and the second electronic contact information by performing operations including:

transmitting web content to allow for entering of a first email address of the user purchaser, and to allow for selection of an indication;

receiving, responsive to the web content, the selection of the indication and indications of at least: the first email address and a second email address of the recipient; and storing, in memory, the first email address as the first electronic contact information and the second email address as the second electronic contact information.

22. The non-transitory computer readable medium of claim 21, wherein the computer-executable instructions, when executed by the computer, further cause the computer to perform operations including:

in response to the receiving the selection of the indication:

transmitting further web content to allow selection of one or more rules from amongst a plurality of rules for obscuring particular content present in the first electronic message from the second electronic message; and responsive to the further web content, receiving an indication of the selection of the one or more rules from amongst the plurality of rules, wherein the generation of the second electronic message includes obscuring the particular content present in the first electronic message from the second electronic message based on the selection.

23. The non-transitory computer readable medium of claim 20, wherein the first electronic message includes information private to the user, and wherein the second electronic message obscures the information private to the user.

* * * * *